US00RE39781E

(19) United States
(12) Reissued Patent
Muraoka et al.

(10) Patent Number: US RE39,781 E
(45) Date of Reissued Patent: Aug. 21, 2007

(54) BRACKET ASSEMBLY, ESPECIALLY FOR USE AS A MAGNETIC DEVICE IN A MONITORING DEVICE

(75) Inventors: Tsutomu Muraoka, Osaka (JP); Kozo Kitagawa, Hyogo (JP); Kazuo Wada, Osaka (JP)

(73) Assignee: Shimano Inc., Osaka (JP)

(21) Appl. No.: 10/988,450

(22) Filed: Nov. 15, 2004

Related U.S. Patent Documents

Reissue of:
(64) Patent No.: 6,331,771
Issued: Dec. 18, 2001
Appl. No.: 09/255,344
Filed: Feb. 23, 1999

(51) Int. Cl.
*G01P 3/487* (2006.01)
*B60B 1/00* (2006.01)
*G01B 7/30* (2006.01)

(52) U.S. Cl. ..... 324/174; 324/207.25; 301/104
(58) Field of Classification Search ..... 324/166–168, 324/173–174, 207.22, 207.25; 301/55–56, 301/59, 104; 335/302–303; 359/522–523
See application file for complete search history.

(56) References Cited

U.S. PATENT DOCUMENTS 3,781,082 A * 12/1973 Linder ..... 359/523
3,854,777 A * 12/1974 Kennedy ..... 301/37
3,898,563 A * 8/1975 Erisman ..... 324/166
4,331,918 A * 5/1982 Dunch ..... 324/174
4,352,063 A * 9/1982 Jones et al. ..... 324/171
5,089,775 A * 2/1992 Takeda ..... 324/174
5,264,791 A * 11/1993 Takeda ..... 324/174
5,452,945 A * 9/1995 Schlanger ..... 301/58

FOREIGN PATENT DOCUMENTS

JP 50-41240 U 8/1973
JP 723692 * 5/1995

OTHER PUBLICATIONS

*Cateye Astrale Cylocomputer, Model CC–CD100*; Ten catalog pages; Prior to Feb. 1999.*
*Cateye General Catalog; Cycle Accessories*; Thirteen Catalog pages; 1996.*

* cited by examiner

*Primary Examiner*—Bot LeDynh
(74) *Attorney, Agent, or Firm*—Global IP Counselors, LLP

(57) ABSTRACT

A magnetic device mounts on a flat spoke of a wheel. This magnetic device can comprise a magnet and a housing. The housing is coupled to the magnet, and has a spoke-receiving recess with a non-circular cross section, and at least one detent. The detent extends from the housing into the spoke-receiving recess to secure a flat spoke within the spoke-receiving recess via a snap-fit. The magnetic device communicates with a sensing device, which is adapted to be coupled to a portion of the bicycle that is adjacent to a wheel of the bicycle. A display unit, adapted to be mounted on handlebars of the bicycle, displays the speed information obtained from the sensing device. In a second embodiment, the housing is made of a more elastic material, and the detents become optional. In a third embodiment, the spoke-receiving recess of the housing has a projection that engages a concavity form in the connecting portion of the spoke. In a fourth embodiment, the spoke-receiving recess of the housing has a concavity that engages a projection form on the connecting portion of the spoke.

131 Claims, 15 Drawing Sheets

BRACKET ASSEMBLY, ESPECIALLY FOR USE AS A MAGNETIC DEVICE IN A MONITORING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention generally relates to a magnetic device for a bicycle monitoring device. More specifically, the present invention relates to a magnet holder of the monitoring device that can be easily installed on a spoke.

2. Background Information

It is an advantage for modem cyclists to know how fast they are going. This is true in both non-competitive and competitive cycling. To that end, speedometer devices for bicycles have become commercially popular. Early forms of these devices had various mechanical disadvantages. One source of difficulty was the means by which the speedometer device sensed that the wheel had rotated. Many speedometers attached a counting device that protruded from the spoke, and would advance a gear or a counter every time the wheel rotated. But these devices were not reliable and subject to breakdown, bending, stiffening, and shifting loose from the appropriate position. This led to inductive-type sensors, which did away with the requirement of actual contact between spoke-attachment and sensor. But these were not always reliable either, due to magnets weakening, slippage on the spoke, tools required for installation, inability to sustain a satisfactory level of tightness, and other reasons.

In view of the above, there exists a need for a magnetic device which overcomes the above mentioned problems in the prior art. This invention addresses this need in the prior art as well as other needs, which will become apparent to those skilled in the art from this disclosure.

SUMMARY OF THE INVENTION

One object of the present invention is to provide a magnetic device that is relatively easy to install on a spoke such that the magnetic device does not rotate or move longitudinally along the axis of the spoke.

Another object of the present invention is to provide a magnetic device that is inexpensive to manufacture.

Another object of the present invention is to provide a magnetic device that can be installed in one step.

Another object of the present invention is to provide a magnetic device that requires no tools for installation.

Another object of the present invention is to provide a magnetic device that can be used with a non-circular cross-section.

Another object of the present invention is to provide a bracket assembly for mounting on a spoke having at least one flat portion, comprising a housing having a flat spoke-receiving recess with non-circular cross section and at least one detent extending from the housing into the flat spoke-receiving recess to secure the at least one flat portion of the spoke within the spoke-receiving recess via a snap-fit.

The foregoing objects basically can be obtained by providing a magnetic device that mounts on a flat portion of a spoke of a wheel. This magnetic device basically comprises a housing with magnetic material fixedly coupled to the housing. The housing can have a spoke-receiving recess with a non-circular cross section, and at least one detent. The detent extends from the housing into the spoke-receiving recess to secure a flat spoke within the spoke-receiving recess via a snap-fit.

The foregoing objects can also basically be obtained by providing a magnetic device that mounts on a flat spoke of a wheel, as described above. The magnetic device communicates with a sensing device, which is adapted to be coupled to a portion of the bicycle that is adjacent to a wheel of the bicycle. A display unit, adapted to be mounted on handlebars of the bicycle, displays the speed information obtained from the sensing device.

Another object of the present invention is to provide a monitoring device for mounting on a spoke having at least one flat portion, comprising a housing having a spoke-receiving recess with a pair of opposed side walls spaced apart by a first predetermined distance and defining a non-circular cross section to receive the at least one flat portion of the spoke therebetween, the side walls being constructed of an elastic material to elastically retain the at least one flat portion of the spoke therebetween, the first predetermined distance being slightly smaller than a predetermined width of the flat portion of the spoke to elastically deform the side walls.

Another object of the present invention is to provide a magnetic device for mounting on a spoke having at least one flat portion, comprising a housing having a spoke-receiving recess with a pair of opposed side walls spaced apart by a first predetermined distance and defining a non-circular cross section to receive the at least one flat portion of the spoke therebetween, the side walls being constructed of an elastic material to elastically retain the at least one flat portion of the spoke therebetween, the first predetermined distance being slightly smaller than a predetermined width of the flat portion of the spoke to elastically deform said the walls; and a magnetic material fixedly coupled to the housing.

Another object of the present invention is to provide a monitoring device for a bicycle, comprising a sensing device; adapted to be coupled to a portion of the bicycle that is adjacent a wheel of the bicycle; a display unit adapted to be mounted on handlebars of the bicycle; and a magnetic device adapted to be mounted on wheel spokes having a flat portion, the magnetic device including a housing and magnetic material fixedly coupled to the housing, the housing having a spoke-receiving recess with a pair of opposed side walls spaced apart by a first predetermined distance and defining a non-circular cross section to receive the at least one flat portion of the spoke therebetween, the side walls being constructed of an elastic material to elastically retain the at least one flat portion of the spoke therebetween, the first predetermined distance being slightly smaller than a predetermined width of the flat portion of the spoke to elastically deform the side walls.

Another object of the present invention is to provide a bracket assembly for mounting on a spoke having at least one flat portion, comprising a housing having a spoke-receiving recess with a pair of opposed side walls spaced apart by a first predetermined distance to retain the spoke therebetween, and a projection extending from the spoke-receiving recess to engage the concavity of the spoke within the spoke-receiving recess.

Another object of the present invention is to provide a magnetic device for mounting on a spoke with a concavity, comprising a housing having a spoke-receiving recess with a pair of opposed side walls spaced apart by a first predetermined distance to retain the spoke therebetween, and a projection extending from the spoke-receiving recess to engage the concavity of the spoke within the spoke-receiving recess; and a magnetic material fixedly coupled to the housing.

Another object of the present invention is to provide a monitoring device for a bicycle, comprising a sensing device; adapted to be coupled to a portion of the bicycle that is adjacent a wheel of the bicycle; a display unit adapted to be mounted on handlebars of the bicycle; and a magnetic device adapted to be mounted on wheel spokes having a flat portion, the magnetic device including a housing and magnetic material fixedly coupled to the housing, the housing having a spoke-receiving recess with a pair of opposed side walls spaced apart by a first predetermined distance to retain the spoke therebetween, and a projection extending from the spoke-receiving recess to engage the concavity of the spoke within the spoke-receiving recess.

These and other objects, features, aspects and advantages of the present invention will become apparent to those skilled in the art from the following detailed description, which, taken in conjunction with the annexed drawings, discloses a preferred embodiment of the present invention .

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
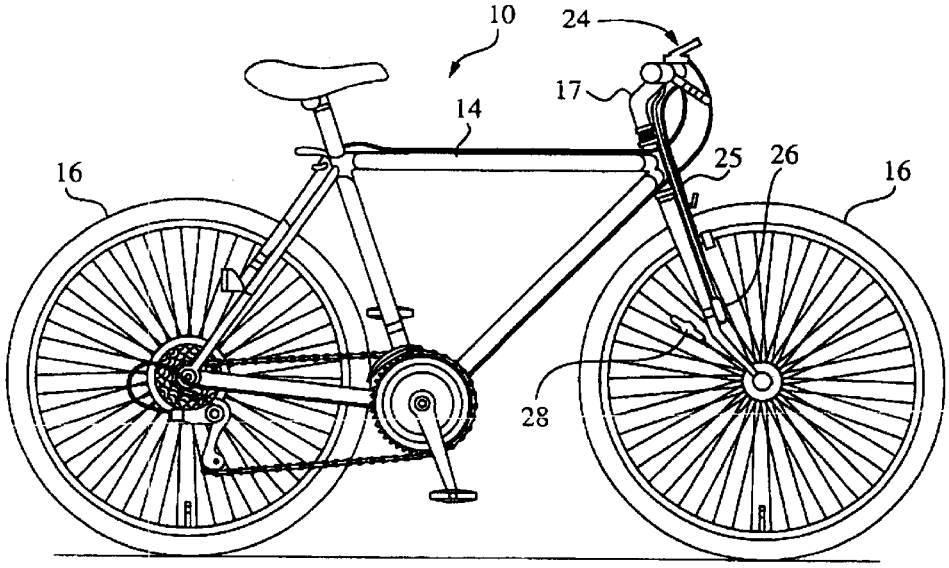
FIG. 1 is a side elevational view of a bicycle with a monitoring device mounted thereto in accordance with the present invention.
Figure 2:
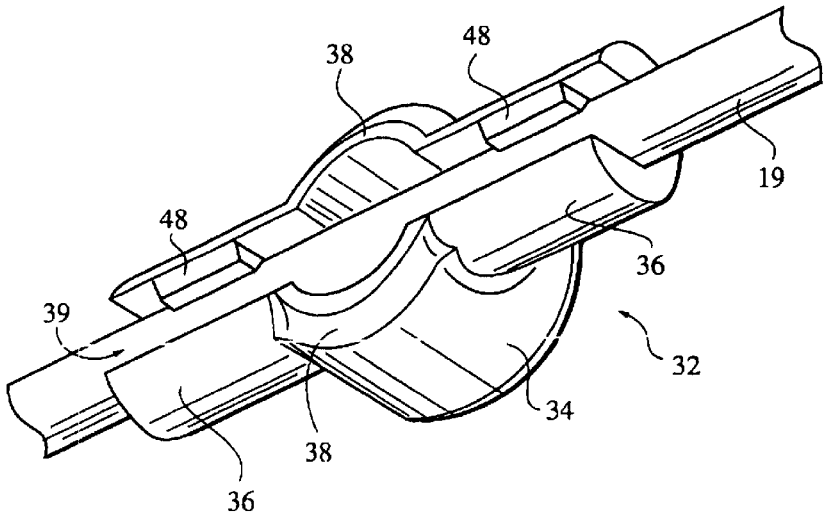
FIG. 2 is a partial front perspective view of a magnetic device mounted on a flat spoke in accordance with a first embodiment of the present invention.
Figure 3:
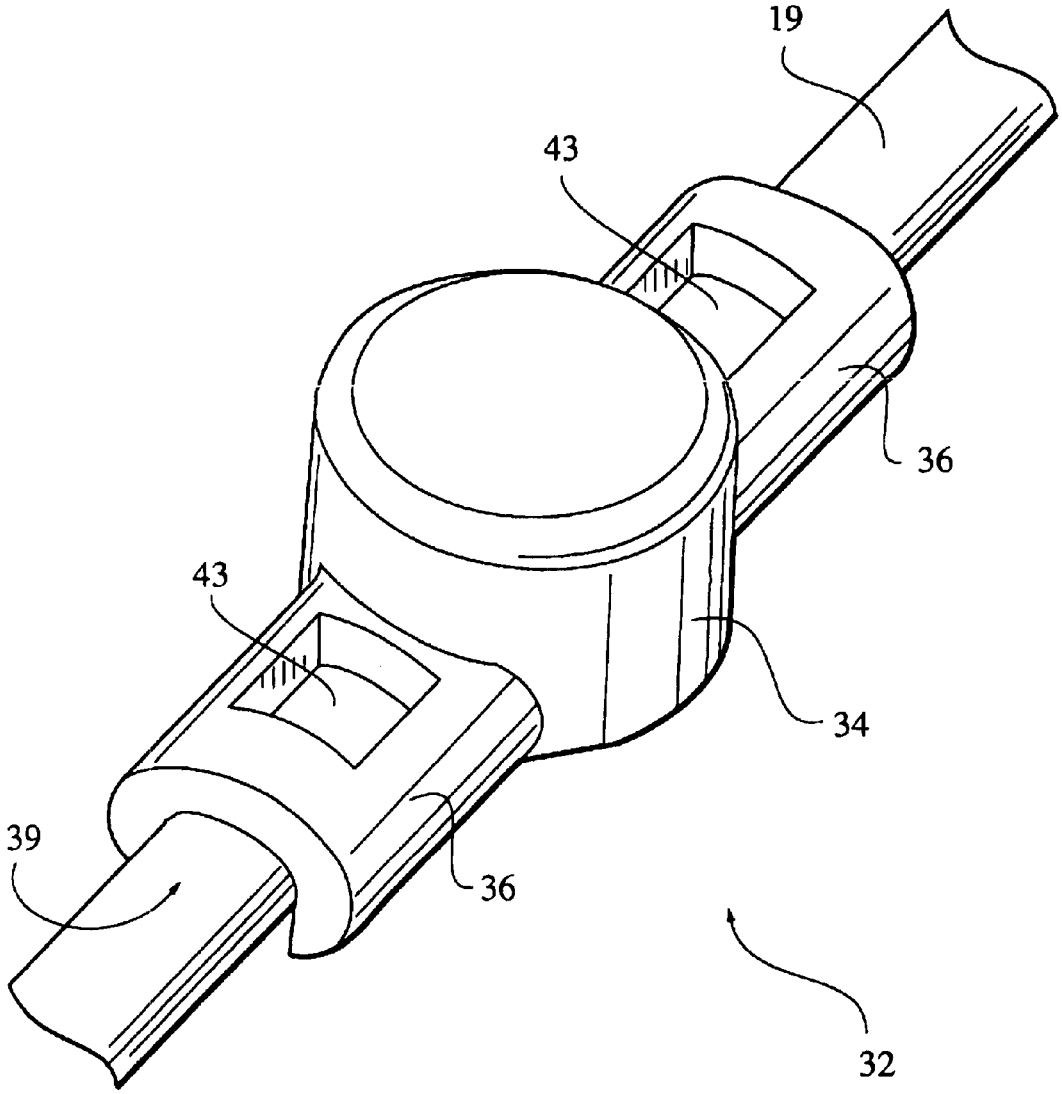
FIG. 3 is a partial rear perspective view of the magnetic device illustrated in FIG. 2, while mounted on a flat spoke.
Figure 4:
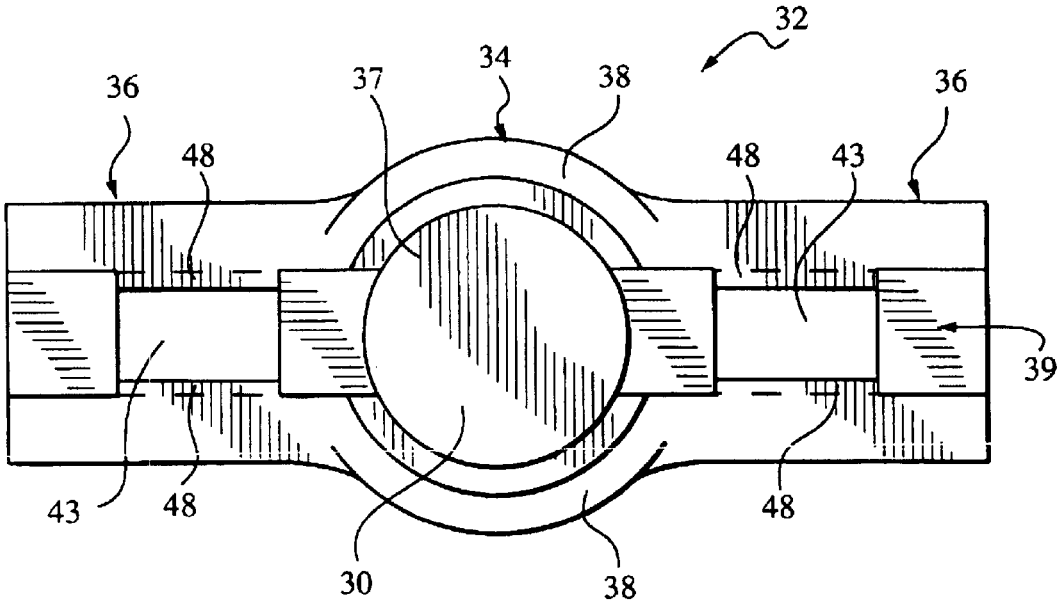
FIG. 4 is a front elevational view of the housing of the magnetic device illustrated in FIGS. 2 and 3.
Figure 5:
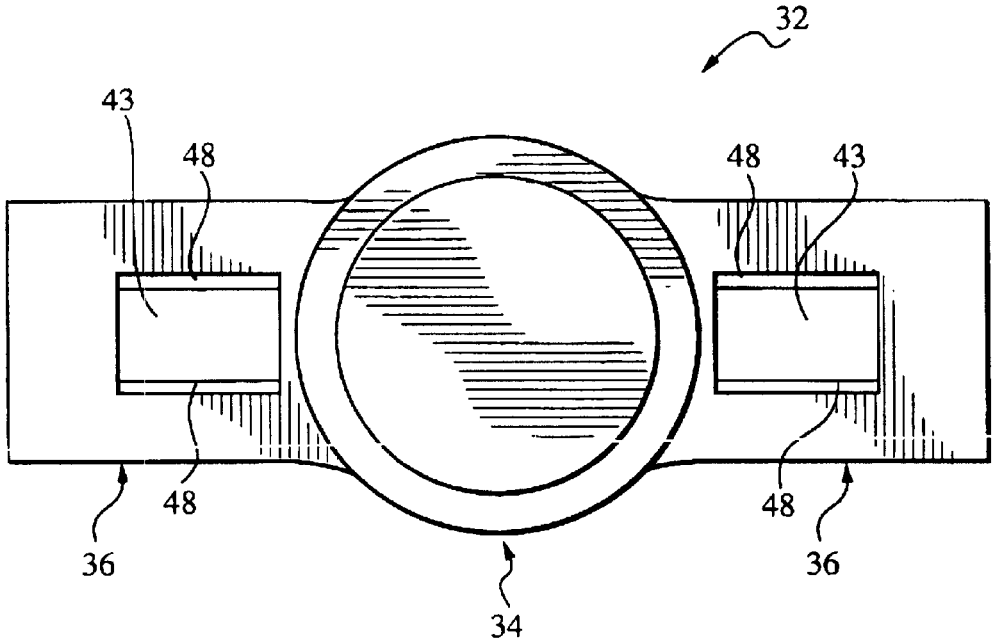
FIG. 5 is a rear elevational view of the housing of the magnetic device illustrated in FIGS. 3–4.

Referring initially to FIG. 1, a bicycle 10 is illustrated with a monitoring device 12 mounted thereon in accordance with the present invention . Bicycles and their various components are well known in the art, and thus, bicycle 10 and its various components will not be discussed or illustrated in detail herein except for the components that relate to the present invention . In other words, only monitoring device 12 and the components of bicycle 10 relating thereto will be discussed and/or illustrated herein.

Bicycle 10 basically includes a frame 14, a pair of wheels 16 and handlebar 17. The bicycle frame 14 has handlebar 18 movably attached thereto for turning front wheel 16. Each of the wheels 16 are conventional wheels that are rotatably coupled to frame 14 in a conventional manner. Each of the wheels 16 has a hub 18, a plurality of spokes 19 and a rim 20. Spokes 19 of each of the wheels 16 extend between hub 18 and rim 20. While the hubs 18 for the wheels 16 are different in the front and rear wheels, these differences are not important to this invention.

Figure 6:
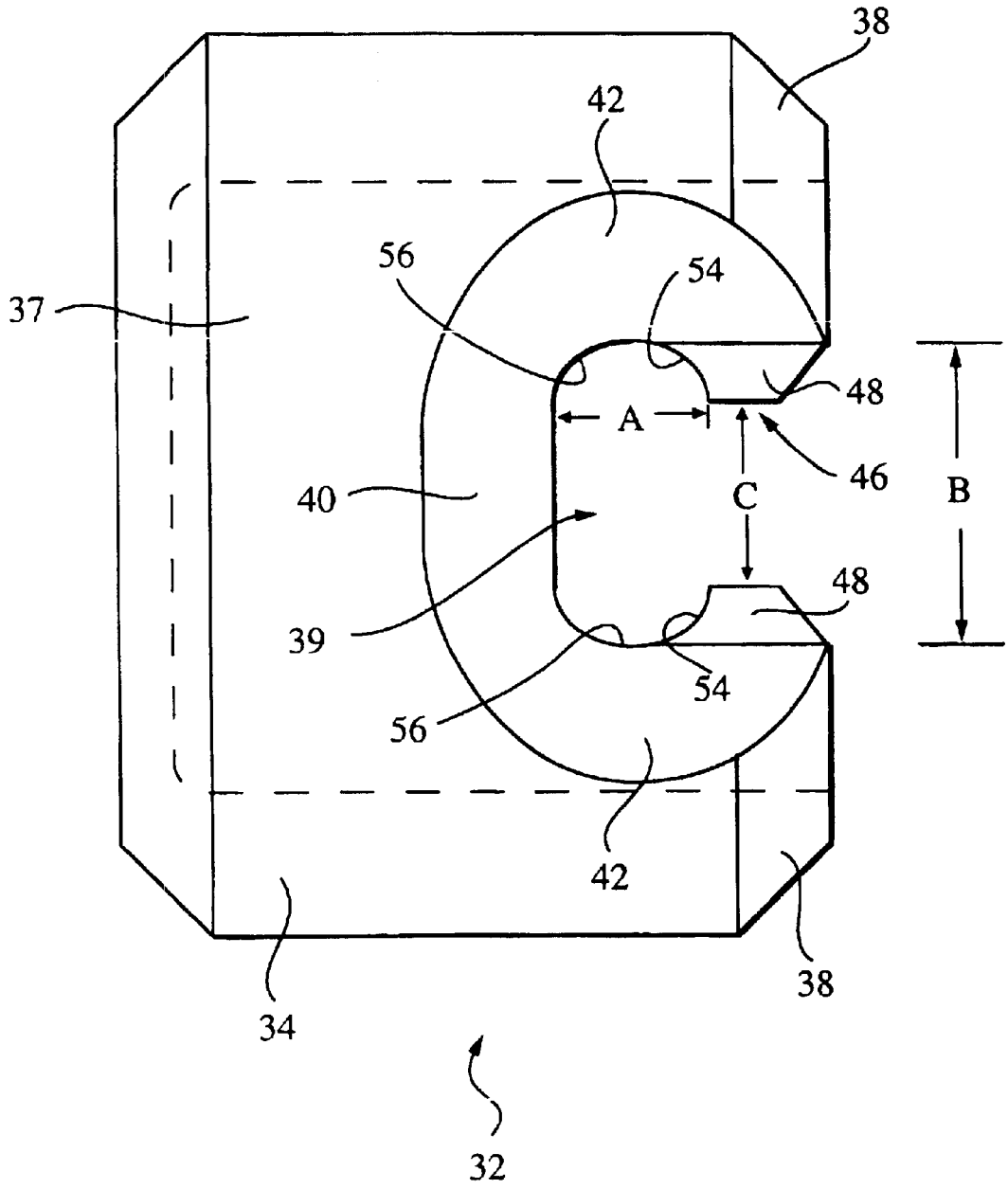
FIG. 6 is an end elevational view of the housing of the magnetic device illustrated in FIGS. 2–5.
Figure 7:
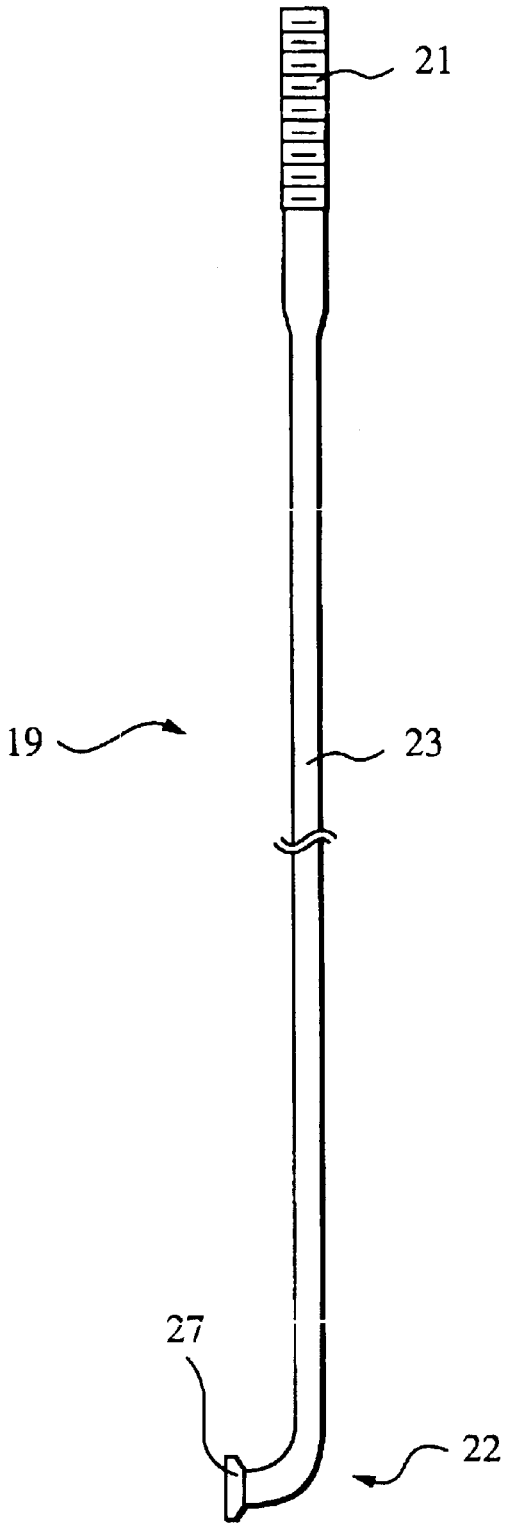
FIG. 7 is a front elevational view of a flat spoke that is used with the magnetic device illustrated in FIGS. 2–6.
Figure 8:
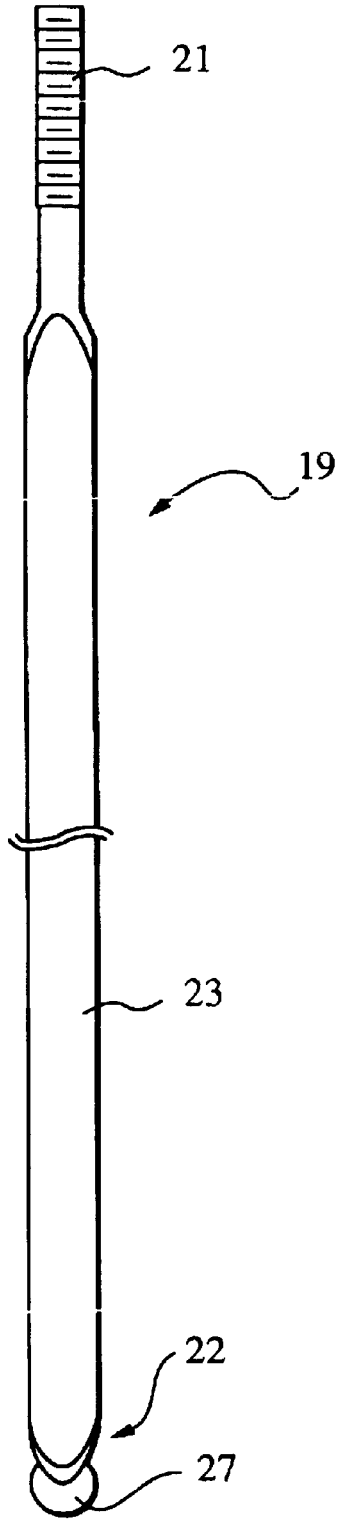
FIG. 8 is a side elevational view of the flat spoke illustrated in FIG. 7.
Figure 9:
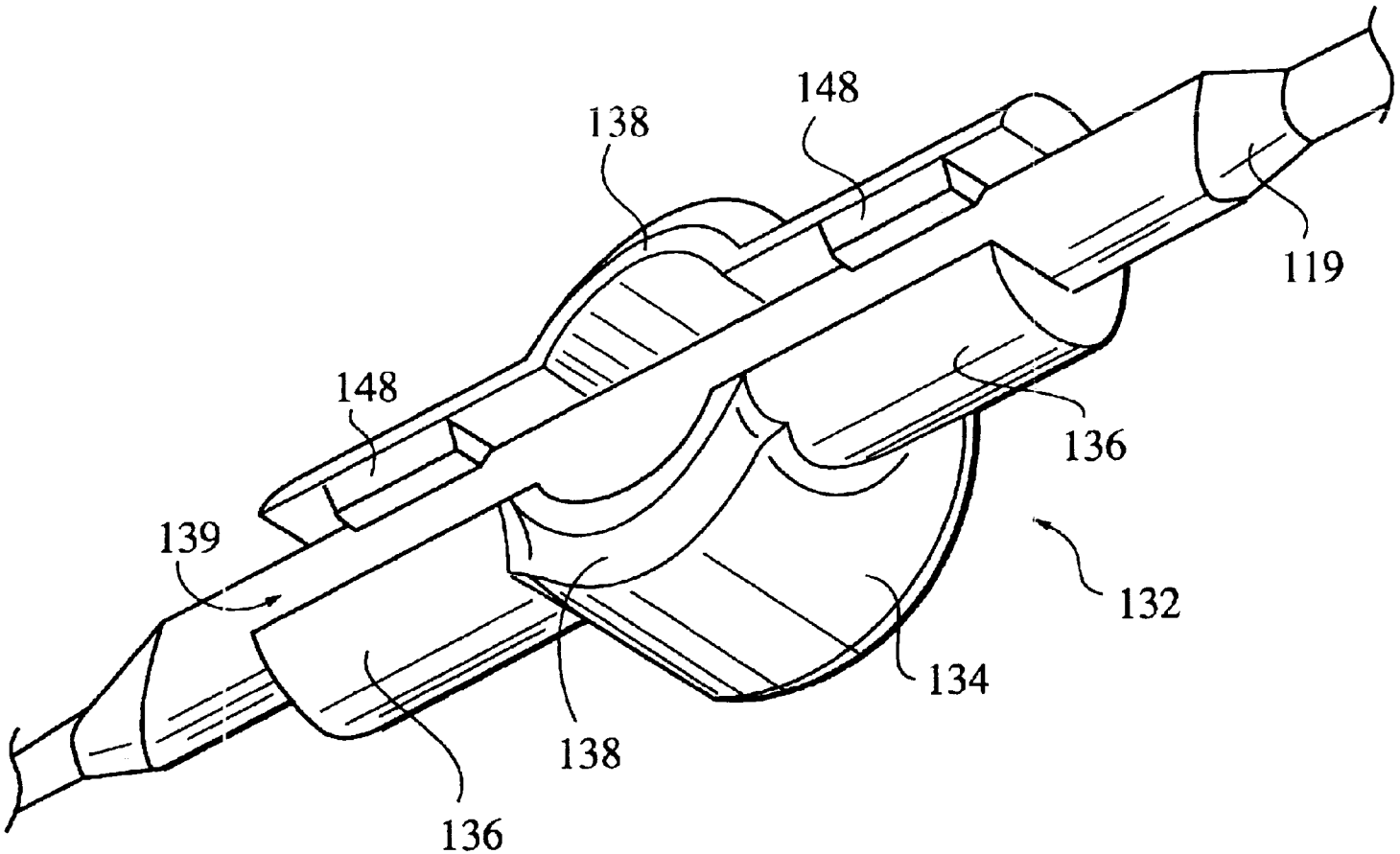
FIG. 9 is a partial front perspective view of a magnetic device mounted on a flat portion of a spoke in accordance with a second embodiment of the present invention.

Spoke 19 has first attachment end 21, second attachment end 22 and a connecting portion 23 extending therebetween. First attachment end 21 can be adapted to be coupled to the corresponding structure of the hub 18. First attachment end 21 is threaded as shown in FIGS. 7 and 8. Second attachment end 22 has a head 27 in the shape of a bent nail head as shown in FIG. 6. Second attachment end 22 can be adapted to be coupled to rim 20 of wheel 16. However, flat spoke 19 can be reversed, so that first attachment end 21 is coupled to rim 20, and second attachment end is coupled to hub 18. Connecting portion 23 has a non-circular cross-sectional, preferably substantially elliptical cross-section.

In this embodiment, as seen in FIGS. 7 and 8, spokes 19 are so-called flat or aerodynamic spokes. Spokes 19 differ from round spokes in that they have a substantially elliptical cross-section, where that cross-section has rounded ends. The cross-sectional length of flat spoke 19 is preferably around 2.75 millimeters. Flat spokes 19 are aligned along hub 18 of wheel 16 so as to decrease wind resistance. This decrease in wind resistance is due to the flattened surface of spoke 19 which lies in the same center plane as wheel 16. Thus, flat spokes 19 are very desirable in bicycle riding.

Monitoring device 12 is adapted to be fixedly coupled to frame 14, handlebar 17 and one of the spokes 19 of one of the wheels 16. In this first embodiment, monitoring device 12 is especially designed for mounting on spoke 19 that has a portion with a non-circular cross-section.

The monitoring device 12 basically includes four parts. In particular, monitoring device 12 basically includes a display unit 24, a wire 25, a sensor 26 and a magnetic device 28. All of the parts are basically conventional parts that are well known in the bicycle art, except for magnetic device 28 which is the subject of the present invention . Therefore, the display unit 24, wire 25 and sensor 26 will not be discussed or illustrated in detail herein. One example of a prior art monitoring device is disclosed in U.S. Pat. No. 5,264,791, which is assigned to Cat Eye Incorporated. This U.S. patent is hereby incorporated herein by reference for the purpose of understanding one particular use of the magnetic device 28 in accordance with the present invention . Accordingly, display unit 24 mentioned above can be of the type mentioned in this U.S. patent or any other prior art device. Similarly, the sensor 26 can be a reed switch or any other type of magnetic sensor that is known in the art.

Magnetic device 28 basically includes a magnet 30 and housing 32. Housing 32 is integrally formed as a one-piece unitary member, preferably of lightweight material. For example, housing 32 can be molded as a one-piece, unitary member from plastic types of materials that can accomplish the essence of the present invention . Housing 32 can also be referred to as a bracket assembly. Housing 32 can alternatively be made of magnetic or magnetized material, and thus, eliminate the need for a separate magnet 30. For example, housing 32 can be constructed of a plastic material with magnetic particles embedded therein. In any case, the construction of the material for housing 32 of magnetic device 28 is preferably lightweight. Magnetic device 28 should have a magnetism that is strong enough to operate sensor 26 without difficulty during rotation of wheel 16.

Housing 32 has a body portion 34 and two retaining portions 36 extending from body portion 34. Body portion 34 can be cylindrical in shape. Housing 32 is preferably constructed of a lightweight material such as a resilient plastic. Housing 32 should be of a resilient material to releasably couple spoke 19 thereto. Body portion 34 has a cylindrical cavity 37 for holding magnet 30, with two semi-circular flanges 38 formed at the open end of cavity 37. Semi-circular flanges 38 are arranged to receive a portion of spoke 19 therebetween when housing 32 is completely installed on one of the spokes 19, and are molded in such a way as to be less likely to break off during handling of housing 32.

The two retaining portions 36 are integrally formed with body portion 34 and extend in opposite directions from body portion 34. In other words, retaining portions 36 are integrally formed with body portion 34 as a one-piece, unitary member. Retaining portions 36 are channel-shaped to form a spoke-receiving recess 39. Each of the retaining portions 36 has a bottom wall 40 and two side walls 42.

Each bottom wall 40 of each retaining portion 36 has an aperture 43 for decreasing weight of housing 32, and increasing flexibility. The two side walls 42 and bottom wall 40 extend outward from body portion 34. Side walls 42 are substantially parallel to each other and also extend substantially perpendicular to the bottom wall 40. Side walls 42 are spaced apart from each other by a predetermined distance B except along detents 48.

Side walls 42 have detents 48 for holding and securing flat spoke 19 via a snap-fit. Preferably, each side wall 42 has two detents 48 that are longitudinally spaced apart from each other along spoke-receiving recess 35. Each detent 48 has a curved outer surface 52 for inserting flat spoke 19. Each detent 48 also has an inner retaining surface 54. Side walls 42 and detents 48 form an opening 46 through which flat spoke 19 can be inserted beneath detents 48. Each retaining portion 36 is flexible so that it can move slightly outwardly to expand the spoke-receiving recess 39 as flat spoke 19 passes into opening 46. The opposing detents 48 are separated from each other by a predetermined distance C.

Bottom wall 40, side walls 42, and the two detents 48 together form a spoke-receiving recess 39. This spoke-receiving recess 39 has a cross-sectional shape of an oval or racetrack, with rounded ends 56, as shown in FIG. 6. Spoke-receiving recess 39 preferably has a length between approximately 10 millimeters and 30 millimeters, preferably around 18 millimeters.

After the flat portion of spoke 19 is initially inserted into spoke-receiving recess 39, housing 32 is then rotated about the axis of flat spoke 19, so that the rounded ends 56 match up with rounded ends of spoke 19. This matching up of surfaces, in combination with inner retaining surface 54 of detent 48, acts to snap-fit spoke 19 into spoke-receiving recess 50. Alternatively, housing 32 can be made of a more elastic material, so that detents 48 could become optional, and the snap-fit is replaced by an elastic fit as in a subsequent embodiment discussed below.

The bottom wall 40 is spaced from inner retaining surfaces 54 by a predetermined distance A. It is an important feature of this invention that, as shown in FIG. 6, distance A be less than distance B, so that housing 32 will more accurately fit the shape of spoke 19. This results in housing 32 not rotating about the axis of the spoke 19, and also orients housing 32 to activate sensor 26.

As shown in FIG. 6, opening 46 (distance C) is smaller than spoke-receiving recess 39 (distance B). This contributes to the snap-fit of housing 32 around the flat portion of spoke 19. Also, housing 32 will have a reduced tendency to work loose from the flat portion of spoke 19, and will remain in place more effectively.

During installation, housing 32 is pressed against spoke 19. At first, detents 48 resist the centerward motion of flat spoke 19, but being made of flexible plastic, can yield to a slight degree. Also, each detent 48 has a curved outer surface which assists in the flat portion of spoke 19 passing through opening 46. While the installer exerts pressure on housing 32 during installation, detents 48 are forced radially outward from the center axis of spoke-receiving recess 39. After the flat portion of spoke 19 passes by detents 48, side walls 42 spring back to return to their original positions. In doing so, inner retaining surfaces 54 engage the flat portion of spoke 19 to hold spoke 19 against the bottom wall 40 of the spoke-receiving recess 39 with a slight pressing force. Thus, housing 32 is frictional retained on spoke 19 to substantially prevent longitudinal movement of magnetic device 12 along the longitudinal axis of spoke 19.

Because housing 32 is snap-fitted, secured by detents 48 applying continual pressure, and very light in weight, no further securing means, such as a screw or a cover, is necessary. Another advantage is that housing 32 is less likely than conventional art to rotate out of position during use, because rounded ends of spoke-receiving recess 39 can more effectively grip rounded ends of flat spoke 19. Also, because of its snap-fit characteristics, housing 32 can be can be installed in one step, and requires no tools for installation.

SECOND EMBODIMENT

Referring now to FIGS. 9–12, a magnetic device 128 is illustrated in accordance with another embodiment of the present invention. In view of the similarities between this embodiment and the prior embodiment, this embodiment will not be discussed or illustrated in detail. Rather, it will be apparent to those skilled in the art from this disclosure that the most of the parts and descriptions of the prior embodiments also apply to the similar or identical parts of this embodiment.

In a second embodiment, housing 132 is constructed of an elastic material, and detents 148 are optional. The term "elastic" as used hereinafter can include materials with some plastic deformation. In any event, the elastic material should substantially return to its initial form or state after being deformed. Thus, magnetic device 128 can be repeatedly installed, removed, and reinstalled, without significantly affecting the shape of housing 132.

Figure 10:
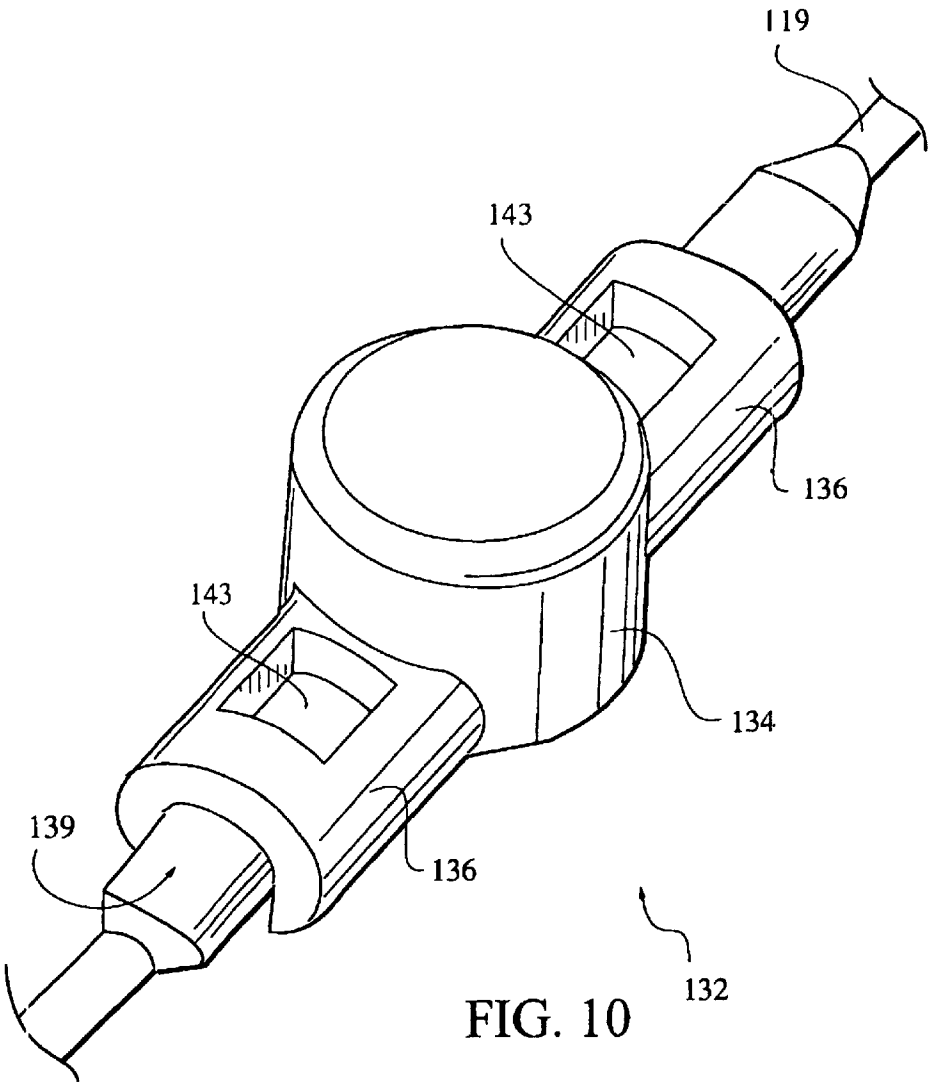
FIG. 10 is a partial rear perspective view of the magnetic device illustrated in FIG. 9, while mounted on the flat portion of the spoke.

Referring initially to FIG. 10, the magnetic device 128 can comprise a magnet 130 and housing 132. As stated, housing 132 is constructed of a lightweight elastomeric material, having elastic properties.

Figure 11:
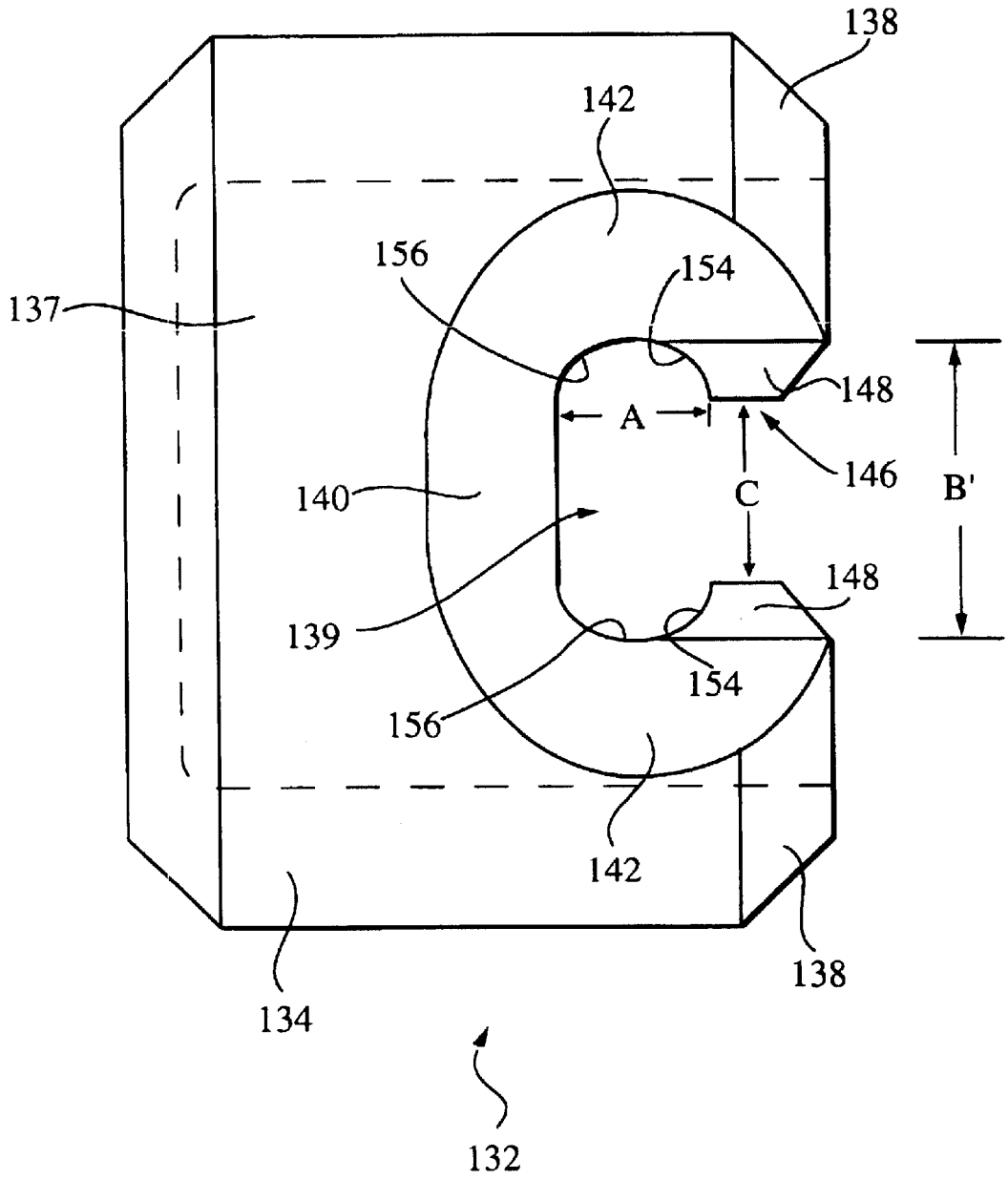
FIG. 11 is an end elevational view of the housing of the magnetic device illustrated in FIGS. 9 and 10.

As shown in FIG. 11, the cross-sectional length B' of spoke-receiving recess is slightly smaller than the cross-sectional width D of the flat portion of spoke 119. For example, length or distance B' is approximately 2.5 millimeters and the flat portion of spoke 119 has a cross-sectional width D of approximately 2.75 millimeters. Accordingly, housing 132 elastically grips the flat portion of spoke 119. Thus, housing 132 will remain in place more effectively.

Housing 132 is integrally formed as a one-piece unitary member, preferably of lightweight material. For example, housing 132 can be molded as a one-piece, unitary member from an elastomeric material that can accomplish the essence of the present invention . Housing 132 can also be referred to as a bracket assembly. Housing 132 can alternatively be made of magnetic or magnetized material, and thus, eliminate the need for a separate magnet 130. For example, housing 132 can be constructed of an elastomeric material with magnetic particles embedded therein. Magnetic device 128 should have a magnetism that is strong enough to operate sensor 26 without difficulty during rotation of wheel 16.

Housing 132 has a body portion 134 and two retaining portions 136 extending from body portion 134. Body portion 134 can be cylindrical in shape. Housing 132 should be of a resilient material to releasably couple spoke 119 thereto. Body portion 134 has a cavity 137 for holding magnet 130, with two semi-circular flanges 138 formed at the open end of cavity 137. Semi-circular flanges 138 are arranged to receive a flat portion of spoke 119 therebetween when housing 132 is completely installed on one of the spokes 119. Retaining portions 136 are channel-shaped to form a spoke-receiving recess 139. Each of the retaining portions 136 has a bottom wall 140 and two side walls 142.

Each bottom wall 140 of each retaining portion 136 has an aperture 143 for decreasing weight of housing 132, and increasing flexibility. The two side walls 142 and bottom wall 140 extend outward from body portion 134. Side walls 142 are substantially parallel to each other and also extend substantially perpendicular to the bottom wall 140. Side walls 142 are spaced apart from each other by a predetermined distance B except along detents 148.

Side walls 142 can optionally have detents 148 for further holding and securing flat surface of spoke 19 via an elastic fit. Preferably, each side wall 142 has two detents 148 that are longitudinally spaced apart from each other along spoke-receiving recess 35. Each detent 148 has a curved outer surface 152 for inserting spoke 119. Each detent 148 also has an inner retaining surface 154. Side walls 142 and detents 148 form an opening 146 through which spoke 119 can be inserted beneath detents 148. Each retaining portion 136 is flexible so that it can move slightly outwardly to expand the spoke-receiving recess 139 as flat surface of spoke 119 passes into opening 146.

Bottom wall 140 and side walls 142 and the two detents 148 together form a spoke-receiving recess 139. This spoke-receiving recess 139 has a cross-sectional shape of an oval or racetrack, with rounded ends 156, as shown in FIG. 11. Spoke-receiving recess 139 preferably has a length between approximately 10 millimeters and 30 millimeters, preferably around 18 millimeters. Detents 48 are optional in this embodiment since that spoke 119 is held within spoke-receiving recess 139 by an elastic fit.

The bottom wall 140 is spaced from inner retaining surfaces 154 by a predetermined distance A. As shown in FIG. 11, distance A be less than distance B', so that housing 132 will more accurately fit the shape of flat portion of spoke 119. This prevents housing 132 from rotating about the axis of the spoke 119, and also orients housing 132 to activate sensor 26.

As shown in FIG. 11, opening 146 (distance C) is smaller than spoke-receiving recess 139 (distance B'). This contributes to the elastic fit of housing 132 around flat portion of spoke 119. Thus, housing 132 will have a reduced tendency to work loose from the flat portion of spoke 119, and will remain in place more effectively.

Figure 12:
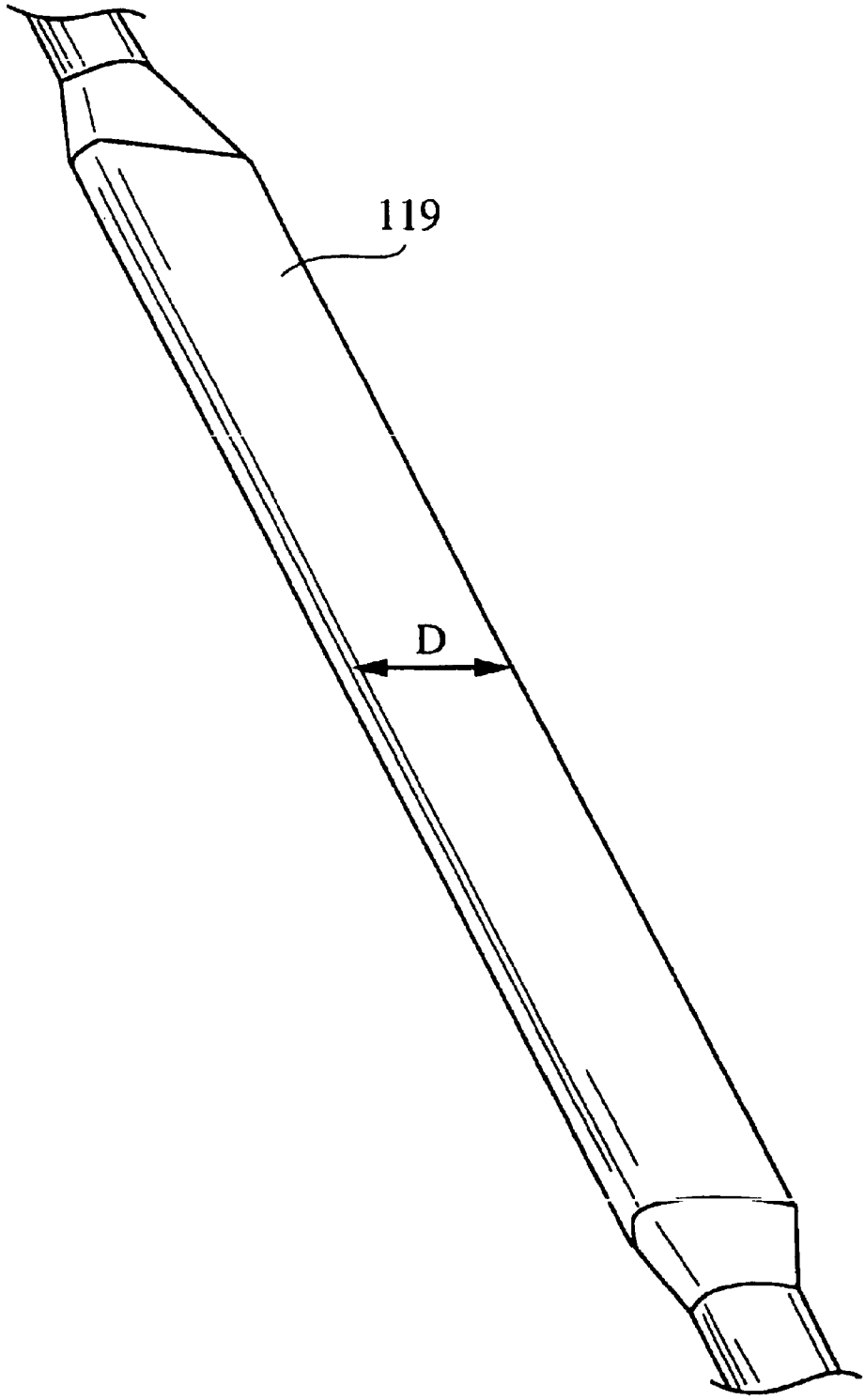
FIG. 12 is a partial perspective view of a portion of the spoke that is used in the second embodiment of the present invention.
Figure 13:
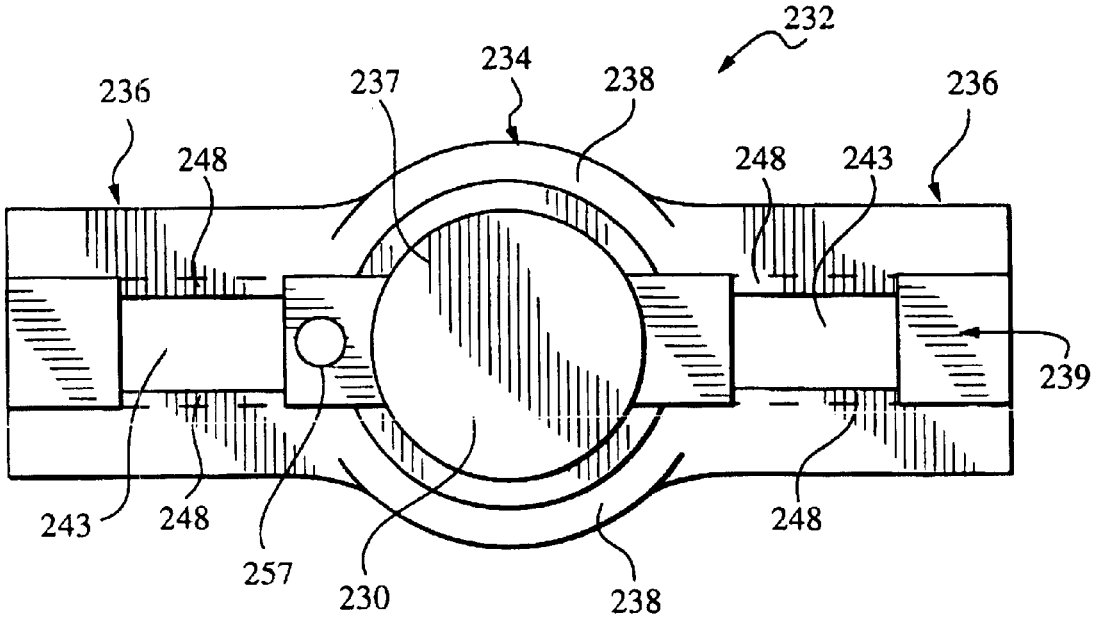
FIG. 13 is a front elevational view of a magnetic device in accordance with a third embodiment of the present invention.
Figure 14:
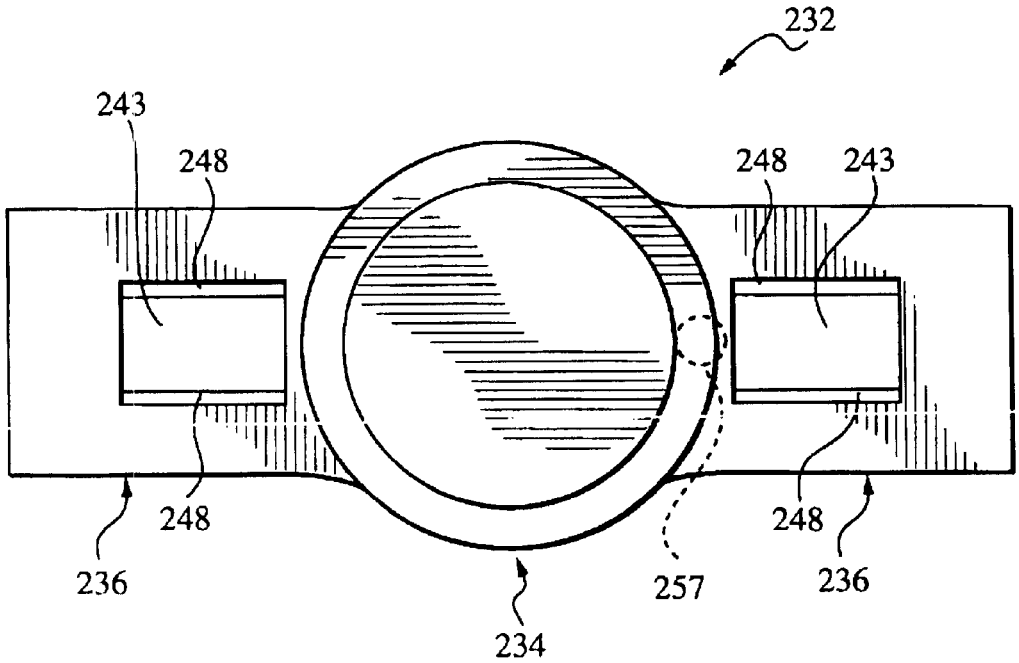
FIG. 14 is a rear elevational view of the housing of the magnetic device illustrated in FIG. 13.

Also, as shown in FIGS. 11 and 12, cross-sectional length of flat section of spoke 119 (distance D) is larger than distance B'. Distance D is preferably around 2.75 millimeters, and distance B' is preferably around 2.5 millimeters. Because spoke-receiving recess 139 is smaller than spoke 119, the elastic properties of housing 132 will cause side walls 142 to push against flat surface of spoke 119. This will increase the gripping force of housing 132 on flat surface of spoke 119.

THIRD EMBODIMENT

Referring now to FIGS. 13–17, a magnetic device 238 is illustrated in accordance with another embodiment of the present invention . Magnetic device 228 is designed to be used with monitoring device 12 of FIG. 1. This third embodiment of the magnetic device 228 is substantially identical to the prior embodiments, except that a projection 257 is provided on the housing 232 and the spoke 219 is provided with a concavity 258. For example, housing 232 can be dimensioned to have a snap-fit configuration or an elastic fit configuration. Also, magnetic device 228 of this embodiment can be used with a variety of spokes, e.g., round, elliptical or flat. In view of the similarities between this embodiment and the prior embodiment, this embodiment will not be discussed or illustrated in detail. Rather, it will be apparent to those skilled in the art from this disclosure that the various parts and descriptions of the prior embodiments apply to the similar or identical parts of this embodiment.

Figure 15:
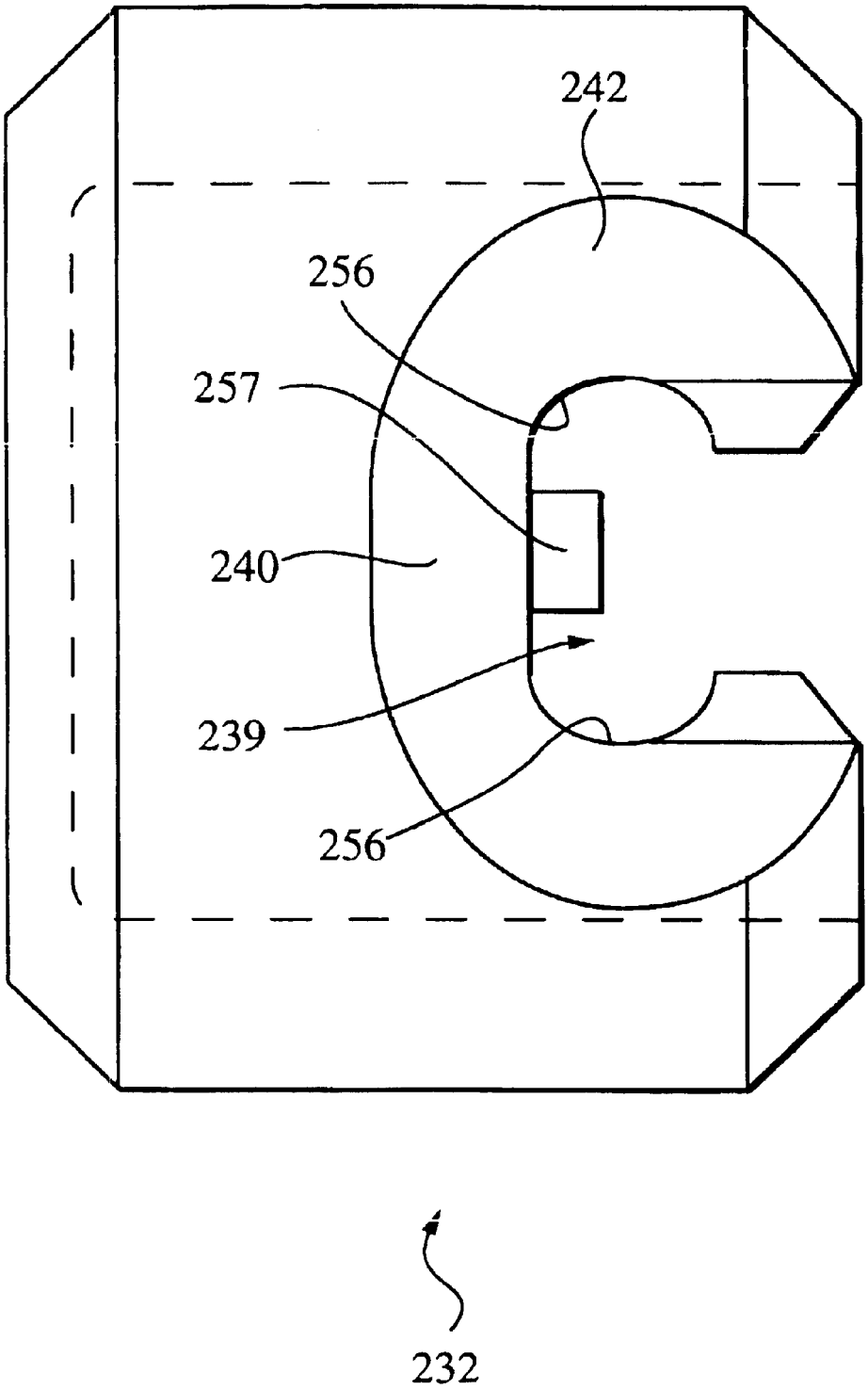
FIG. 15 is an end elevational view of the housing of the magnetic device illustrated in FIGS. 13 and 14.
Figure 16:
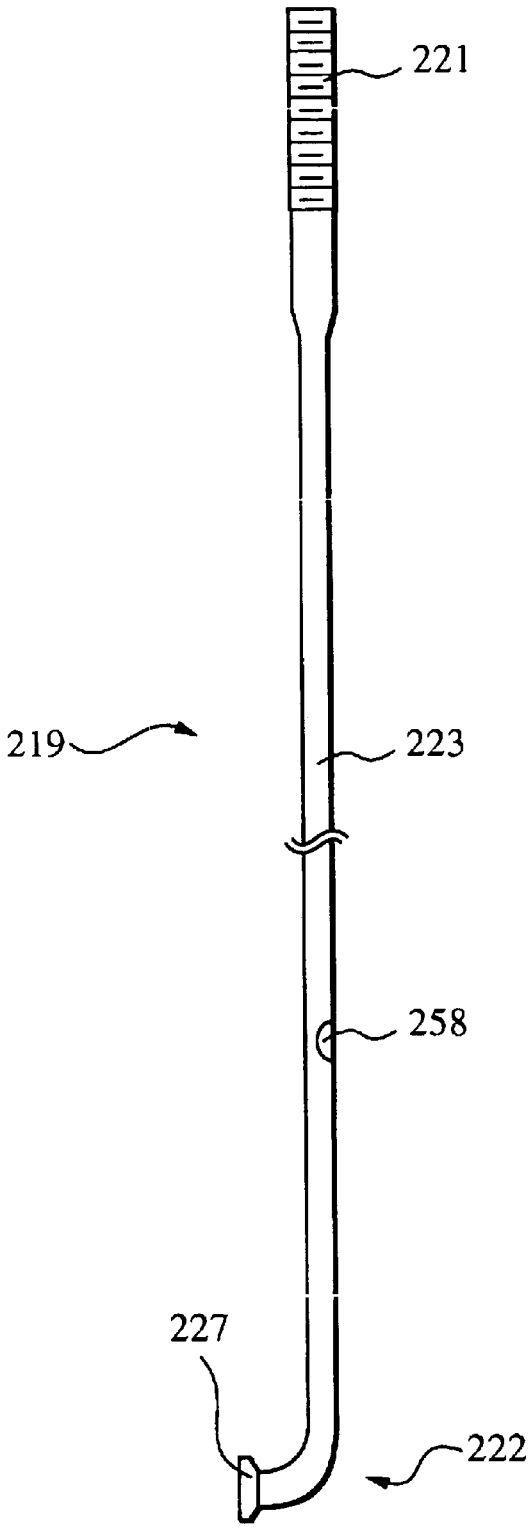
FIG. 16 is a front elevational view of a spoke that is used with the magnetic device illustrated in FIGS. 13–15.
Figure 17:
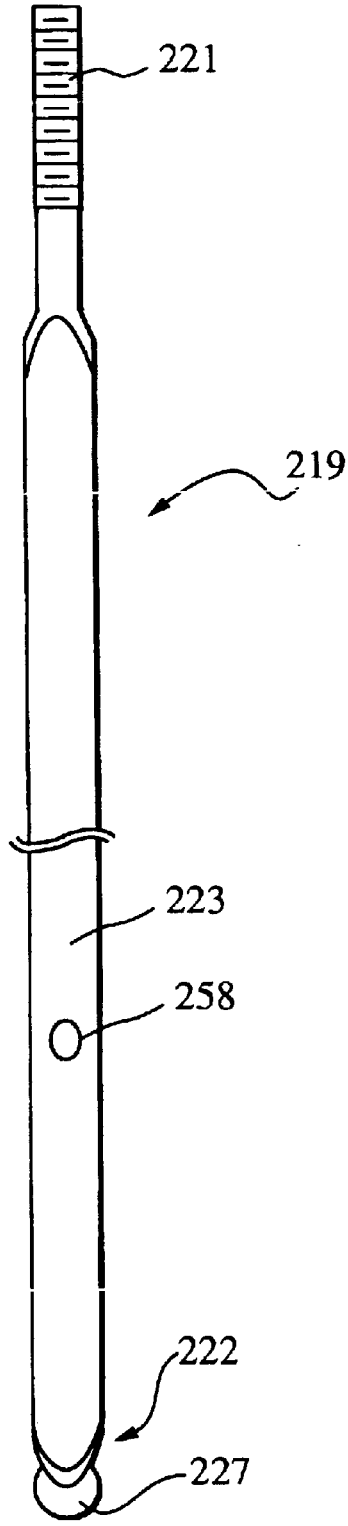
FIG. 17 is a side elevational view of the spoke illustrated in FIG. 16.
Figure 18:
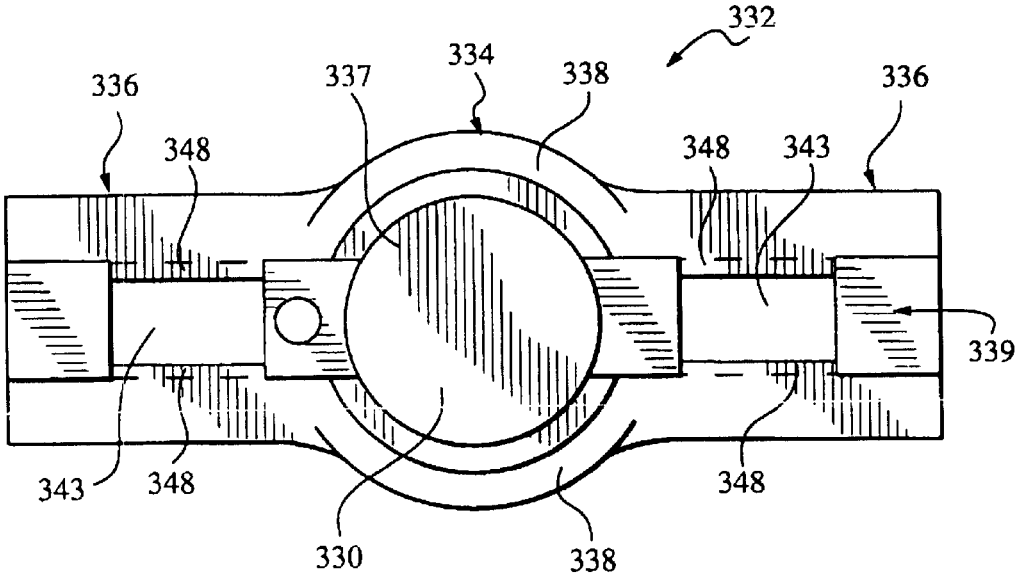
FIG. 18 is a front elevational view of a magnetic device in accordance with a fourth embodiment of the present invention.
Figure 19:
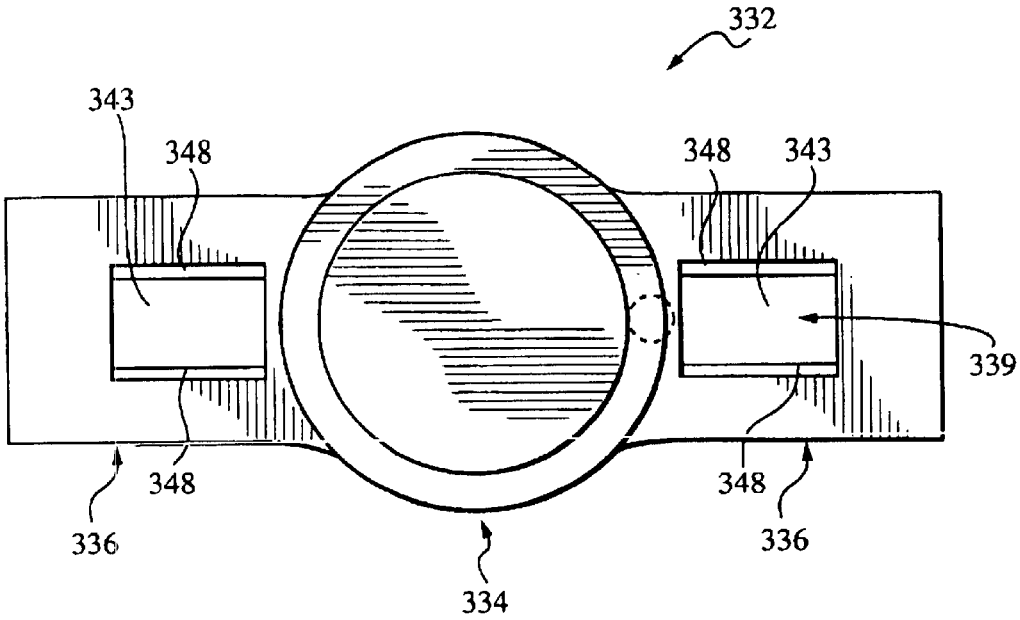
FIG. 19 is a rear elevational view of the housing of the magnetic device illustrated in FIG. 18.

Housing 232 can have magnet 230, body portion 234, and retaining portions 236. Retaining portions 236 are channel-shaped to form a spoke-receiving recess 239. Each of the retaining portions 236 has a bottom wall 240 and two side walls 242. Bottom wall 240, side walls 242, and two detents 248 together form spoke-receiving recess 239. This spoke-receiving recess 239 has a cross-sectional shape of an oval or racetrack, with rounded ends 256, as shown in FIG. 15. Housing 232 also has a projection 257 formed from bottom wall 240 of one of the retaining portions 236. The projection 257 extends outward approximately 0.7 millimeters. Spoke 219 has a corresponding concave surface 258, as shown in FIGS. 16 and 17, for accommodating projection 257. This matching up of projection 257 to concave surface or concavity 258 acts to further secure spoke 219 into spoke-receiving recess 239, and prevent relative movement between spoke 219 and housing 232.

FOURTH EMBODIMENT

Referring now to FIGS. 18–22, a magnetic device 328 is illustrated in accordance with another embodiment of the present invention . Magnetic device 328 is designed to be used with monitoring device 12 of FIG. 1. This fourth embodiment of the magnetic device 328 is substantially identical to the prior embodiments, except that a projection 357 is provided on the spoke 319 and housing 332 is provided with a concavity 358. For example, housing 332 can be dimensioned to have a snap-fit configuration or an elastic fit configuration. Also, magnetic device 328 of this embodiment can be used with a variety of spokes, e.g., round, elliptical or flat. In view of the similarities between this embodiment and the prior embodiment, this embodiment will not be discussed or illustrated in detail. Rather, it will be apparent to those skilled in the art from this disclosure that the various parts and descriptions of the prior embodiments apply to the similar or identical parts of this embodiment.

Figure 20:
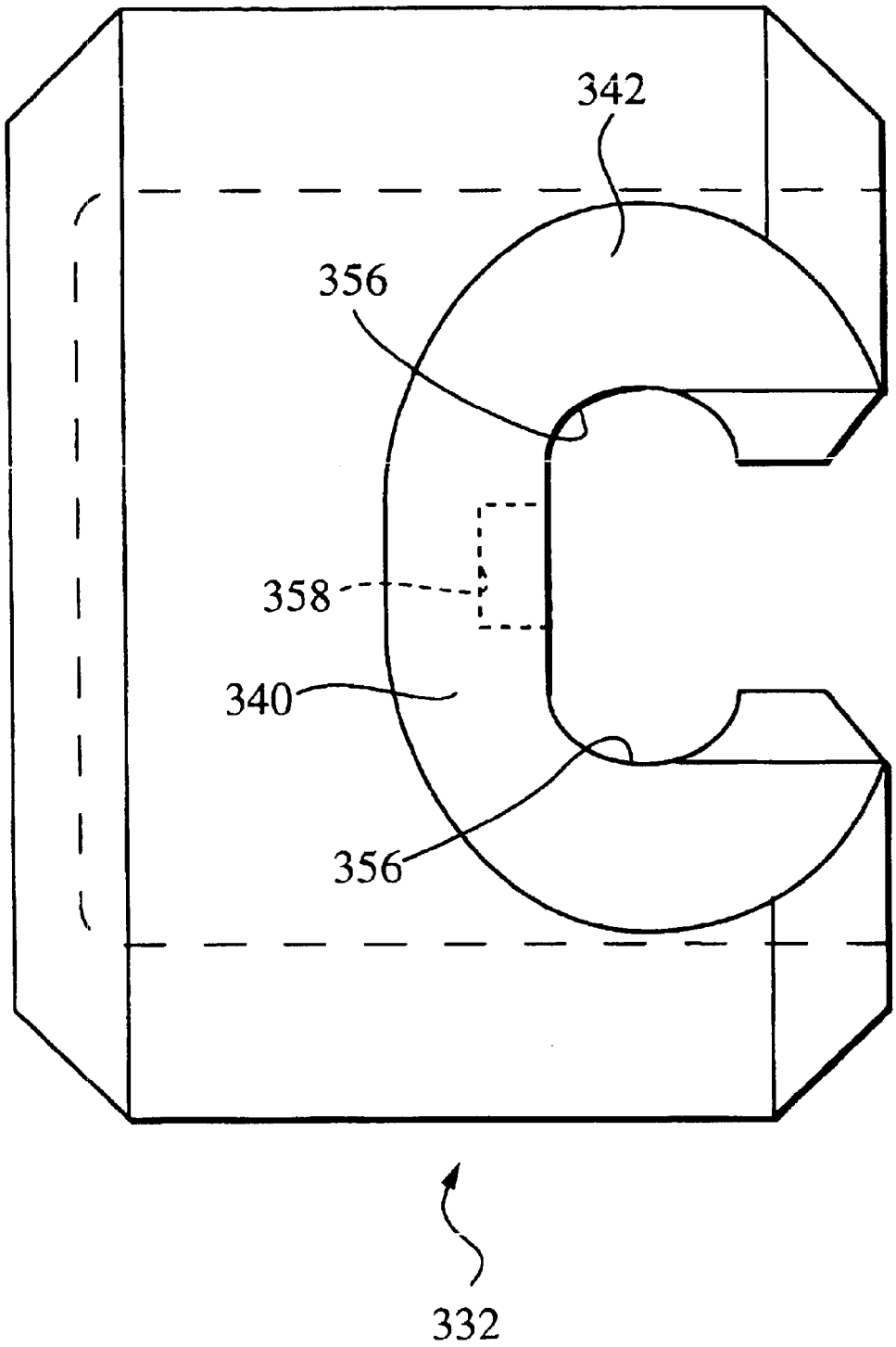
FIG. 20 is an end elevational view of the housing of the magnetic device illustrated in FIGS. 18 and 19.
Figure 21:
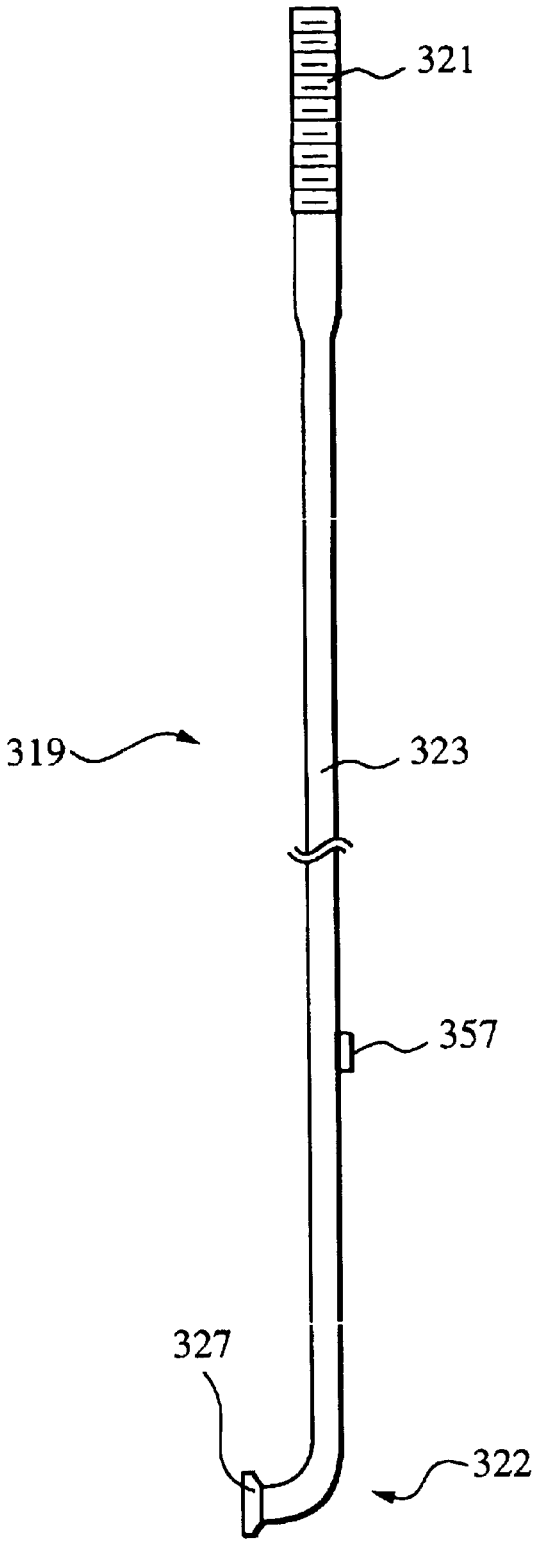
FIG. 21 is a front elevational view of a spoke that is used with the magnetic device illustrated in FIGS. 18–20.
Figure 22:
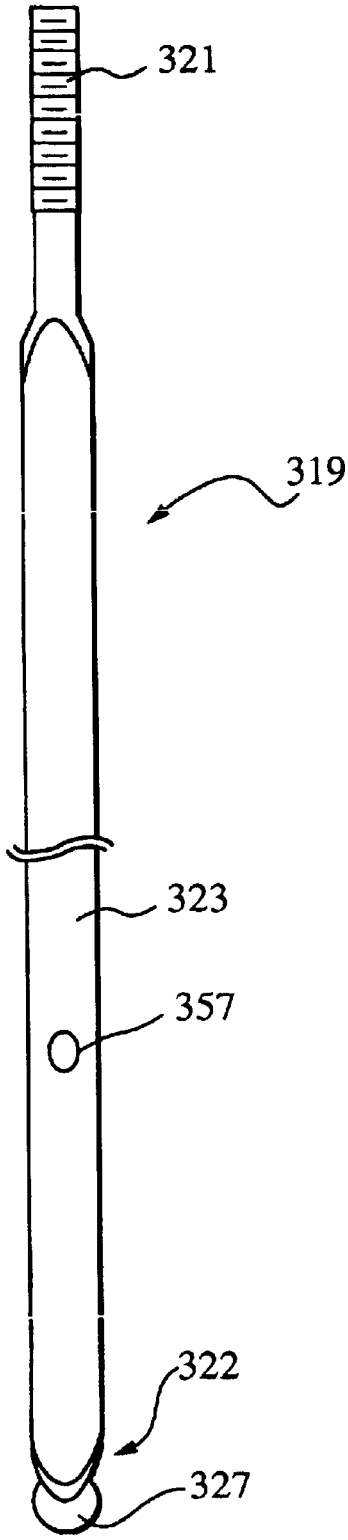
FIG. 22 is a side elevational view of the spoke illustrated in FIG. 21.

Housing 332 can have magnet 330, body portion 334, and retaining portions 236. Retaining portions 336 are channel-shaped to form a spoke-receiving recess 339. Each of the retaining portions 336 has a bottom wall 340 and two side walls 342. Bottom wall 340, side walls 342, and two detents 348 together form spoke-receiving recess 339. This spoke-receiving recess 339 has a cross-sectional shape of an oval or racetrack, with rounded ends 356, as shown in FIG. 20. As shown in FIGS. 21 and 22, spoke 319 also has a projection 357 formed from its surface. Housing 332 has a corresponding concave surface 358 in one of its retaining walls 336, as shown in FIG. 20, for accommodating projection 357. This matching up of projection 357 to concave surface or concavity 358 acts to further secure spoke 319 into spoke-receiving recess 339, and prevent relative movement between spoke 319 and housing 332.

While several embodiments have been chosen to illustrate the present invention , it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bracket assembly for mounting on a single spoke having at least one flat portion, comprising:

a housing having a flat spoke-receiving recess with non-circular cross section, *a body portion with a magnet receiving cavity contiguous with the flat spoke-receiving recess,* and at least one detect extending from said housing into said flat spoke-receiving recess to non-rotatably secure the at least one flat portion of the single spoke within said spoke-receiving recess via a snap-fit.

[2. A bracket assembly according to claim 1, wherein said housing includes a body portion with a cavity adapted to receive a magnet within said cavity.]

3. A bracket assembly according to claim 1, wherein said housing further includes a second detent that is longitudinally spaced from said one detent along said spoke-receiving recess.

4. A bracket assembly according to claim 3, wherein said housing further includes third and fourth detents with said third detent being located opposite said one detent and said fourth detent being located opposite second detent.

5. A bracket assembly according to claim [2] *1*, wherein said housing includes a first retaining portion extending from said body portion, said first retaining portion forms at least part of said spoke-receiving recess.

6. A bracket assembly according to claim 5, wherein said housing includes a second retaining portion extending from said body portion, said second retaining portion being aligned with said first retaining portion to form at least part of said spoke-receiving recess.

7. A bracket assembly according to claim 6, wherein said spoke-receiving recess has a length of approximately ten millimeters to approximately thirty millimeters.

8. A bracket assembly according to claim 6, wherein each of said retaining portions has a pair of side walls extending from a bottom wall to form said spoke-receiving recess.

9. A bracket assembly according to claim 8, wherein each of said bottom walls has an aperture.

10. A bracket assembly according to claim 1, wherein said housing is integrally formed as a one-piece, unitary member.

11. A bracket assembly [according to claim 1, wherein] *for mounting on a single spoke having at least one flat portion, comprising:*

*a housing having a flat spoke-receiving recess with non-circular cross section and at least one detent extending from said housing into said flat spoke-receiving recess to non-rotatably secure the at least one flat portion of the single spoke within said spoke-receiving recess via a snap-fit,* said housing [is] *being* constructed of magnetic material.

12. A bracket assembly according to claim 1, wherein said spoke-receiving recess has a pair of side walls extending from a bottom wall to form an opening to receive the at least one flat portion of the spoke therein.

13. A bracket assembly according to claim 12, wherein said at least one detent has a retaining surface that is opposed to a bottom wall located between said side walls, said side walls being spaced apart by a first predetermined distance at said at least one detent, and portions of said side walls located between said bottom wall and said retaining surface being spaced apart by a second predetermined distance, said first predetermined distance being smaller than said second predetermined distance.

14. A bracket assembly according to claim 13, wherein said at least one detent has a retaining surface that is opposed to said bottom wall and spaced from said bottom wall by a third predetermined distance, said third predetermined distance being smaller than said second predetermined distance.

15. A bracket assembly according to claim 12, wherein said at least one detent has a retaining surface that is opposed to a bottom wall located between said side walls, portions of said side walls located between said bottom wall and said retaining surface being spaced apart by a first predetermined distance, said retaining surface being spaced from said bottom wall by a second predetermined distance, said first predetermined distance being greater than said second predetermined distance.

16. A magnetic device for mounting on a single spoke having at least one flat portion, comprising:

a housing having a spoke-receiving recess with non-circular cross section and at least one detent extending from said housing into said spoke-receiving recess to non-rotatably secure the at least one flat portion of the single spoke within said spoke-receiving recess via a snap-fit; and a magnetic material fixedly coupled to said housing.

17. A magnetic device according to claim 16, wherein said housing includes a body portion with a cavity, and said magnetic material is a magnet that is fixedly secured within said cavity.

18. A magnetic device according to claim 16, wherein said housing further includes a second detent that is longitudinally spaced from said one detent along said spoke-receiving recess.

19. A magnetic device according to claim 18, wherein said housing further includes third and fourth detents with said third detent being located opposite said one detent and said fourth detent being located opposite second detent.

20. A magnetic device according to claim 17, wherein said housing includes a first retaining portion extending from said body portion, said first retaining portion forms at least part of said spoke-receiving recess.

21. A magnetic device according to claim 20, wherein said housing includes a second retaining portion extending from said body portion, said second retaining portion being aligned with said first retaining portion to form at least part of said spoke-receiving recess.

22. A magnetic device according to claim 21, wherein said spoke-receiving recess has a length of approximately ten millimeters to approximately thirty millimeters.

23. A magnetic device according to claim 21, wherein each of said retaining portions has a bottom wall and a pair of side walls extending from said bottom wall to form said spoke-receiving recess.

24. A magnetic device according to claim 23, wherein each of said bottom walls has an aperture.

25. A magnetic device according to claim 16, wherein said housing is integrally formed as a one-piece, unitary member.

26. A magnetic device according to claim 16, wherein said housing is constructed of magnetic material.

27. A magnetic device according to claim 16, wherein said spoke-receiving recess is formed by a pair of side walls extending from a bottom wall to form an opening between said side walls to insert the spoke into said spoke-receiving recess.

28. A magnetic device according to claim 27, wherein said at least one detent has a retaining surface that is opposed to a bottom wall located between said side walls, said side walls being spaced apart by a first predetermined distance at said at least one detent, and portions of said side walls located between said bottom wall and said retaining surface being spaced apart by a second predetermined distance, said first predetermined distance being smaller than said second predetermined distance.

29. A magnetic device according to claim 28, wherein said at least one detent has an retaining surface that is opposed to said bottom wall and spaced from said bottom wall by a third predetermined distance, said third predetermined distance being smaller than said second predetermined distance.

30. A magnetic device according to claim 27, wherein said at least one detent has a retaining surface that is opposed to a bottom wall located between said side walls, portions of said side walls located between said bottom wall and said retaining surface being spaced apart by a first predetermined distance, said retaining surface being spaced from said bottom wall by a second predetermined distance, said first predetermined distance being greater than said second predetermined distance.

31. A monitoring device for a bicycle, comprising:

a sensing device; adapted to be coupled to a portion of the bicycle that is adjacent a wheel of the bicycle;

a display unit adapted to be mounted on handlebars of the bicycle; and a magnetic device adapted to be mounted on a single spoke of a spoked wheel, the single spoke having a flat portion, said magnetic device including a housing and magnetic material fixedly coupled to said housing, said housing having a spoke-receiving recess with non-circular cross section and at least one detent extending from said housing into said spoke-receiving recess to non-rotatably secure the at least one flat portion of the single spoke within said spoke-receiving recess via a snap-fit.

32. A monitoring device according to claim 31, wherein said housing includes a body portion with a cavity, and said magnetic material is a magnet that is fixedly secured within said cavity.

33. A monitoring device according to claim 31, wherein said housing further includes a second detent that is longitudinally spaced from said one detent along said spoke-receiving recess.

34. A monitoring device according to claim 32, wherein said housing further includes third and fourth detents with said third detent being located opposite said one detent and said fourth detent being located opposite second detent.

35. A monitoring device according to claim 32, wherein said housing includes a first retaining portion extending from said body portion, said first retaining portion forms at least part of said spoke-receiving recess.

36. A monitoring device according to claim 35, wherein said housing includes a second retaining portion extending from said body portion, said second retaining portion being aligned with said first retaining portion to form at least part of said spoke-receiving recess.

37. A monitoring device according to claim 36, wherein said spoke-receiving recess has a length of approximately ten millimeters to approximately thirty millimeters.

38. A monitoring device according to claim 36, wherein each of said retaining portions has a pair of side walls extending from a bottom wall to form said spoke-receiving recess.

39. A monitoring device according to claim 38, wherein each of said bottom walls has an aperture.

40. A monitoring device according to claim 31, wherein said housing is integrally formed as a one-piece, unitary member.

41. A monitoring device according to claim 31, wherein said housing is constructed of said magnetic material.

42. A monitoring device according to claim 31, wherein said spoke-receiving recess has a pair of side walls extending from a bottom wall to form an opening to receive the at least one flat portion of the spoke therein.

43. A monitoring device according to claim 42, wherein said at least one detent has a retaining surface that is opposed to a bottom wall located between said side walls, said side walls being spaced apart by a first predetermined distance at said at least one detent, and portions of said side walls located between said bottom wall and said retaining surface being spaced apart by a second predetermined distance, said first predetermined distance being smaller than said second predetermined distance.

44. A monitoring device according to claim 43, wherein said at least one detent has a retaining surface that is opposed to said bottom wall and spaced from said bottom wall by a third predetermined distance, said third predetermined distance being smaller than said second predetermined distance.

45. A monitoring device according to claim 42, wherein said at least one detent has a retaining surface that is opposed to a bottom wall located between said side walls, portions of said side walls located between said bottom wall and said retaining surface being spaced apart by a first predetermined distance, said retaining surface being spaced from said bottom wall by a second predetermined distance, said first predetermined distance being greater than said second predetermined distance.

46. A bracket assembly for mounting on a single spoke having at least one flat portion, comprising:

a housing having a spoke-receiving recess with a pair of opposed side walls spaced apart by a first predetermined distance and defining a non-circular cross section to non-rotatably receive the at least one flat portion of the single spoke therebetween, said side walls being constructed of an elastic material to elastically retain the at least one flat portion of the single spoke therebetween, said first predetermined distance being slightly smaller than a predetermined width of the at least one flat portion of the single spoke to elastically deform said side walls.

47. A bracket assembly according to claim 46, wherein said housing further includes a body portion with a cavity adapted to receive a magnet within said cavity.

48. A bracket assembly according to claim 46, wherein one of said side walls of said housing further includes a first detent extending into said spoke-receiving recess.

49. A bracket assembly according to claim 48, wherein said housing further includes a second detent that is longitudinally spaced from said one detent along said spoke-receiving recess.

50. A bracket assembly according to claim 49, wherein said housing further including third and fourth detents with said third detent being located opposite said one detent and said fourth detent being located opposite second detent.

51. A bracket assembly according to claim 46, wherein said housing includes a first retaining portion extending from said body portion, said first retaining portion forms at least part of said spoke-receiving recess.

52. A bracket assembly according to claim 51, wherein said housing includes a second retaining portion extending from said body portion, said second retaining portion being aligned with said first retaining portion to form at least part of said spoke-receiving recess.

53. A bracket assembly according to claim 52, wherein said spoke-receiving recess has a length of approximately ten millimeters to approximately thirty millimeters.

54. A bracket assembly according to claim 52, wherein each of said retaining portions has a bottom wall located between said side walls, each of said bottom walls having an aperture.

55. A bracket assembly according to claim 46, wherein said housing is integrally formed as a one-piece, unitary member.

56. A bracket assembly according to claim 46, wherein said housing is constructed of magnetic material.

57. A bracket assembly according to claim 48, wherein said at least one detent has a retaining surface that is opposed to a bottom wall located between said side walls, said side walls being spaced apart by a first predetermined distance at said at least one detent, and portions of said side walls located between said bottom wall and said retaining surface being spaced apart by a second predetermined distance, said first predetermined distance being smaller than said second predetermined distance.

58. A bracket assembly according to claim 57, wherein said at least one detent has a retaining surface that is opposed to a bottom wall and spaced from said bottom wall by a third predetermined distance, said third predetermined distance being smaller than said second predetermined distance.

59. A bracket assembly according to claim 48, wherein said at least one detent has a retaining surface that is opposed to a bottom wall located between said side walls, portions of said side walls located between said bottom wall and said retaining surface being spaced apart by a first predetermined distance, said retaining surface being spaced from said bottom wall by a second predetermined distance, said first predetermined distance being greater than said second predetermined distance.

60. A magnetic device for mounting on a single spoke having at least one flat portion, comprising:

a housing having a spoke-receiving recess with a pair of opposed side walls spaced apart by a first predetermined distance and defining a non-circular cross section to non-rotatably receive the at least one flat portion of the single spoke therebetween, said side walls being constructed of an elastic material to elastically retain the at least one flat portion of the single spoke therebetween, said first predetermined distance being slightly smaller than a predetermined width of the at least one flat portion of the single spoke to elastically deform said side walls; and a magnetic material fixedly coupled to said housing.

61. A magnetic device according to claim 60, wherein said housing further includes a body portion with a cavity adapted to receive a magnet within said cavity.

62. A magnetic device according to claim 60, wherein one of said side walls of said housing further includes a first detent extending into said spoke-receiving recess.

63. A magnetic device according to claim 62, wherein said housing further includes a second detent that is longitudinally spaced from said one detent along said spoke-receiving recess.

64. A magnetic device according to claim 63, wherein said housing further including third and fourth detents with said third detent being located opposite said one detent and said fourth detent being located opposite second detent.

65. A magnetic device according to claim 60, wherein said housing includes a first retaining portion extending from said body portion, said first retaining portion forms at least part of said spoke-receiving recess.

66. A magnetic device according to claim 65, wherein said housing includes a second retaining portion extending from said body portion, said second retaining portion being aligned with said first retaining portion to form at least part of said spoke-receiving recess.

67. A magnetic device according to claim 66, wherein said spoke-receiving recess has a length of approximately ten millimeters to approximately thirty millimeters.

68. A magnetic device according to claim 66, wherein each of said retaining portions has a bottom wall located between said side walls, each of said bottom walls having an aperture.

69. A magnetic device according to claim 60, wherein said housing is integrally formed as a one-piece, unitary member.

70. A magnetic device according to claim 60, wherein said housing is constructed of magnetic material.

71. A magnetic device according to claim 62, wherein said at least one detent has a retaining surface that is opposed to a bottom wall located between said side walls, said side walls being spaced apart by a first predetermined distance at said at least one detent, and portions of said side walls located between said bottom wall and said retaining surface being spaced apart by a second predetermined distance, said first predetermined distance being smaller than said second predetermined distance.

72. A magnetic device according to claim 71, wherein said at least one detent has a retaining surface that is opposed to a bottom wall located between said side walls and spaced from said bottom wall by a third predetermined distance, said third predetermined distance being smaller than said second predetermined distance.

73. A magnetic device according to claim 60, wherein said at least one detent has a retaining surface that is opposed to a bottom wall located between said side walls, portions of said side walls located between said bottom wall and said retaining surface being spaced apart by a first predetermined distance, said retaining surface being spaced from said bottom wall by a second predetermined distance, said first predetermined distance being greater than said second predetermined distance.

74. A monitoring device for a bicycle, comprising:

a sensing device; adapted to be coupled to a portion of the bicycle that is adjacent a wheel of the bicycle;

a display unit adapted to be mounted on handlebars of the bicycle; and a magnetic device adapted to be mounted on a single spoke of a spoked wheel, the single spoke having at least one flat portion, said magnetic device including a housing and magnetic material fixedly coupled to said housing, said housing having a spoke-receiving recess with a pair of opposed side walls spaced apart by a first predetermined distance and defining a non-circular cross section to non-rotatably receive the at least one flat portion of the single spoke therebetween, said side walls being constructed of an elastic material to elastically retain the at least one flat portion of the single spoke therebetween, said first predetermined distance being slightly smaller than a predetermined width of the at least one flat portion of the single spoke to elastically deform said side walls.

75. A [magnetic] *monitoring* device according to claim 74, wherein said housing further includes a body portion with a cavity adapted to receive a magnet within said cavity.

76. A monitoring device according to claim 74, wherein one of said side walls of said housing further includes a first detent extending into said spoke-receiving recess.

77. A monitoring device according to claim 76, wherein said housing further includes a second detent that is longitudinally spaced from said one detent along said spoke-receiving recess.

78. A monitoring device according to claim 77, wherein said housing further including third and fourth detents with said third detent being located opposite said one detent and said fourth detent being located opposite second detent.

79. A monitoring device according to claim 74, wherein said housing includes a first retaining portion extending from said body portion, said first retaining portion forms at least part of said spoke-receiving recess.

80. A monitoring device according to claim 79, wherein said housing includes a second retaining portion extending from said body portion, said second retaining portion being aligned with said first retaining portion to form at least part of said spoke-receiving recess.

81. A monitoring device according to claim 80, wherein said spoke-receiving recess has a length of approximately ten millimeters to approximately thirty millimeters.

82. A monitoring device according to claim 80, wherein each of said retaining portions has a bottom wall located between said side walls, each of said bottom walls having an aperture.

83. A monitoring device according to claim 74, wherein said housing is integrally formed as a one-piece, unitary member.

84. A monitoring device according to claim 74, wherein said housing is constructed of magnetic material.

85. A monitoring device according to claim 76, wherein said at least one detent has a retaining surface that is opposed to a bottom wall located between said side walls, said side walls being spaced apart by a first predetermined distance at said at least one detent, and portions of said side walls located between said bottom wall and said retaining surface being spaced apart by a second predetermined distance, said first predetermined distance being smaller than said second predetermined distance.

86. A monitoring device according to claim 85, wherein said at least one detent has a retaining surface that is opposed to a bottom wall located between said side walls and spaced from said bottom wall by a third predetermined distance, said third predetermined distance being smaller than said second predetermined distance.

87. A monitoring device according to claim 74, wherein said at least one detent has a retaining surface that is opposed to a bottom wall located between said side walls, portions of said side walls located between said bottom wall and said retaining surface being spaced apart by a first predetermined distance, said retaining surface being spaced from said bottom wall by a second predetermined distance, said first predetermined distance being greater than said second predetermined distance.

88. A bracket assembly for mounting on a spoke with a concavity, comprising:

a housing having a spoke-receiving recess with a pair of opposed side walls spaced apart by a first predetermined distance to retain the spoke therebetween, and a projection extending from said spoke-receiving recess to engage the concavity of the spoke within said spoke-receiving recess.

89. A bracket assembly according to claim 88, wherein said housing further includes a body portion with a cavity adapted to receive a magnet within said cavity.

90. A bracket assembly according to claim 88, wherein one of said side walls of said housing further includes a first detent extending into said spoke-receiving recess.

91. A bracket assembly according to claim 90, wherein said housing further includes a second detent that is longitudinally spaced from said one detent along said spoke-receiving recess.

92. A bracket assembly according to claim 91, wherein said housing further including third and fourth detents with said third detent being located opposite said one detent and said fourth detent being located opposite second detent.

93. A bracket assembly according to claim 88, wherein said housing includes a first retaining portion extending from said body portion, said first retaining portion forms at least part of said spoke-receiving recess.

94. A bracket assembly according to claim 93, wherein said housing includes a second retaining portion extending from said body portion, said second retaining portion being aligned with said first retaining portion to form at least part of said spoke-receiving recess.

95. A bracket assembly according to claim 94, wherein said spoke-receiving recess has a length of approximately ten millimeters to approximately thirty millimeters.

96. A bracket assembly according to claim 94, wherein each of said retaining portions has a bottom wall located between said side walls, each of said bottom walls having an aperture.

97. A bracket assembly according to claim 88, wherein said housing is integrally formed as a one-piece, unitary member.

98. A bracket assembly according to claim 88, wherein said housing is constructed of magnetic material.

99. A bracket assembly according to claim 90, wherein said at least one detent has a retaining surface that is opposed to a bottom wall located between said side walls, said side walls being spaced apart by a first predetermined distance at said at least one detent, and portions of said side walls located between said bottom wall and said retaining surface being spaced apart by a second predetermined distance, said first predetermined distance being smaller than said second predetermined distance.

100. A bracket assembly according to claim 99, wherein said at least one detent has a retaining surface that is opposed to a bottom wall and spaced from said bottom wall by a third predetermined distance, said third predetermined distance being smaller than said second predetermined distance.

101. A bracket assembly according to claim 90, wherein said at least one detent has a retaining surface that is opposed to a bottom wall located between said side walls, portions of said side walls located between said bottom wall and said retaining surface being spaced apart by a first predetermined distance, said retaining surface being spaced from said bottom wall by a second predetermined distance, said first predetermined distance being greater than said second predetermined distance.

102. A bracket assembly according to claim 90, wherein said projection is located on a bottom wall between said side walls.

103. A magnetic device for mounting on a spoke with a concavity, comprising:

a housing having a spoke-receiving recess with a pair of opposed side walls spaced apart by a first predetermined distance to retain the spoke therebetween, and a projection extending from said spoke-receiving recess to engage the concavity of the spoke within said spoke-receiving recess; and a magnetic material fixedly coupled to said housing.

104. A magnetic device according to claim 103, wherein said housing further includes a body portion with a cavity adapted to receive a magnet within said cavity.

105. A magnetic device according to claim 103, wherein one of said side walls of said housing further includes a first detent extending into said spoke-receiving recess.

106. A magnetic device according to claim 105, wherein said housing further includes a second detent that is longitudinally spaced from said one detent along said spoke-receiving recess.

107. A magnetic device according to claim 106, wherein said housing further including third and fourth detents with said third detent being located opposite said one detent and said fourth detent being located opposite second detent.

108. A magnetic device according to claim 103, wherein said housing includes a first retaining portion extending from said body portion, said first retaining portion forms at least part of said spoke-receiving recess.

109. A magnetic device according to claim 108, wherein said housing includes a second retaining portion extending from said body portion, said second retaining portion being aligned with said first retaining portion to form at least part of said spoke-receiving recess.

110. A magnetic device according to claim 109, wherein said spoke-receiving recess has a length of approximately ten millimeters to approximately thirty millimeters.

111. A magnetic device according to claim 109, wherein each of said retaining portions has a bottom wall located between said side walls, each of said bottom walls having an aperture.

112. A magnetic device according to claim 103, wherein said housing is integrally formed as a one-piece, unitary member.

113. A magnetic device according to claim 103, wherein said housing is constructed of magnetic material.

114. A magnetic device according to claim 105, wherein said at least one detent has a retaining surface that is opposed to a bottom wall located between said side walls, said side walls being spaced apart by a first predetermined distance at said at least one detent, and portions of said side walls located between said bottom wall and said retaining surface being spaced apart by a second predetermined distance, said first predetermined distance being smaller than said second predetermined distance.

115. A magnetic device according to claim 105, wherein said at least one detent has a retaining surface that is opposed to a bottom wall located between said side walls and spaced from said bottom wall by a third predetermined distance, said third predetermined distance being smaller than said second predetermined distance.

116. A magnetic device according to claim 105, wherein said at least one detent has a retaining surface that is opposed to a bottom wall located between said side walls, portions of said side walls located between said bottom wall and said retaining surface being spaced apart by a first predetermined distance, said retaining surface being spaced from said bottom wall by a second predetermined distance, said first predetermined distance being greater than said second predetermined distance.

117. A magnetic device according to claim 103, wherein said projection is located on a bottom wall between said side walls.

118. A monitoring device for a bicycle, comprising:

a sensing device; adapted to be coupled to a portion of the bicycle that is adjacent a wheel of the bicycle;

a display unit adapted to be mounted on handlebars of the bicycle; and a magnetic device adapted to be mounted on a spoke with a concavity of a spoked wheel, said magnetic device including a housing and magnetic material fixedly coupled to said housing, said housing having a spoke-receiving recess with a pair of opposed side walls spaced apart by a first predetermined distance to retain the spoke therebetween, and a projection extending from said spoke-receiving recess to engage the concavity of the spoke within said spoke-receiving recess.

119. A magnetic device according to claim 118, wherein said housing further includes a body portion with a cavity adapted to receive a magnet within said cavity.

120. A monitoring device according to claim 118, wherein one of said side walls of said housing further includes a first detent extending into said spoke-receiving recess.

121. A monitoring device according to claim 120, wherein said housing further includes a second detent that is longitudinally spaced from said one detent along said spoke-receiving recess.

122. A monitoring device according to claim 121, wherein said housing further including third and fourth detents with said third detent being located opposite said one detent and said fourth detent being located opposite second detent.

123. A monitoring device according to claim 118, wherein said housing includes a first retaining portion extending from said body portion, said first retaining portion forms at least part of said spoke-receiving recess.

124. A monitoring device according to claim 123, wherein said housing includes a second retaining portion extending from said body portion, said second retaining portion being aligned with said first retaining portion to form at least part of said spoke-receiving recess.

125. A monitoring device according to claim 124, wherein said spoke-receiving recess has a length of approximately ten millimeters to approximately thirty millimeters.

126. A monitoring device according to claim 124, wherein each of said retaining portions has a bottom wall located between said side walls, each of said bottom walls having an aperture.

127. A monitoring device according to claim 118, wherein said housing is integrally formed as a one-piece, unitary member.

128. A monitoring device according to claim 118, wherein said housing is constructed of magnetic material.

129. A monitoring device according to claim 120, wherein said at least one detent has a retaining surface that is opposed to a bottom wall located between said side walls, said side walls being spaced apart by a first predetermined distance at said at least one detent, and portions of said side walls located between said bottom wall and said retaining surface being spaced apart by a second predetermined distance, said first predetermined distance being smaller than said second predetermined distance.

130. A monitoring device according to claim 129, wherein said at least one detent has a retaining surface that is opposed to a bottom wall located between said side walls and spaced from said bottom wall by a third predetermined distance, said third predetermined distance being smaller than said second predetermined distance.

131. A monitoring device according to claim 120, wherein said at least one detent has a retaining surface that is opposed to a bottom wall located between said side walls, portions of said side walls located between said bottom wall and said retaining surface being spaced apart by a first predetermined distance, said retaining surface being spaced from said bottom wall by a second predetermined distance, said first predetermined distance being greater than said second predetermined distance.

132. A monitoring device according to claim 118, wherein said projection is located on a bottom wall between said side walls.

* * * * *